(12) United States Patent
Kitazawa et al.

(10) Patent No.: US 9,946,894 B2
(45) Date of Patent: Apr. 17, 2018

(54) DATA PROCESSING METHOD AND DATA PROCESSING DEVICE

(71) Applicant: PANASONIC INTELLECTUAL PROPERTY MANAGEMENT CO., LTD., Osaka (JP)

(72) Inventors: Atsurou Kitazawa, Fukuoka (JP); Kouji Mutou, Fukuoka (JP); Minoru Ozaki, Fukuoka (JP); Yutaka Iyoki, Fukuoka (JP); Tadaomi Asou, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/744,750

(22) Filed: Jun. 19, 2015

(65) Prior Publication Data
US 2015/0378627 A1 Dec. 31, 2015

(30) Foreign Application Priority Data

Jun. 27, 2014 (JP) .................................. 2014-132723
Apr. 16, 2015 (JP) .................................. 2015-083824

(51) Int. Cl.
*G06F 3/06* (2006.01)
*G06F 21/62* (2013.01)
*H04L 29/06* (2006.01)

(52) U.S. Cl.
CPC ...... *G06F 21/6245* (2013.01); *G06F 21/6209* (2013.01); *H04L 63/10* (2013.01); *G06F 2221/2107* (2013.01)

(58) Field of Classification Search
CPC .......... G06F 12/00; G06F 12/14; G06F 3/062; G06F 3/06; G06F 3/0619
USPC .................................. 711/100, 154, 162, 163
See application file for complete search history.

(56) References Cited

U.S. PATENT DOCUMENTS

| 4,467,421 | A | * | 8/1984 | White | G06F 3/0613 711/118 |
|---|---|---|---|---|---|
| 7,937,453 | B1 | * | 5/2011 | Hayden | G06F 17/30203 707/607 |
| 2003/0065931 | A1 | * | 4/2003 | Nakai | G06F 12/1408 713/193 |
| 2004/0059869 | A1 | * | 3/2004 | Orsley | G06F 11/1076 711/114 |
| 2004/0073746 | A1 | * | 4/2004 | Fallon | H04N 9/8042 711/111 |

(Continued)

FOREIGN PATENT DOCUMENTS

JP 2011-248711 12/2011

*Primary Examiner* — Tuan Thai
(74) *Attorney, Agent, or Firm* — Greenblum & Bernstein, P.L.C.

(57) ABSTRACT

Provided is a data processing method in a data processing device that is connected to an external storage device and that is equipped with a storage device, the method including: receiving a writing instruction to store first data in the storage device; dividing the first data into multiple pieces of division data; storing at least one or more of the pieces of division data in the external storage device; and storing second data different from the first data in the storage device, in which the second data is associated with the first data and the multiple pieces of division data. With the data processing method, security in data management can be improved.

9 Claims, 17 Drawing Sheets

(56) References Cited

U.S. PATENT DOCUMENTS

2004/0075688 A1* 4/2004 Cortesi .................. G06F 17/50
715/763
2005/0038822 A1* 2/2005 Bijaoui ................ G06F 9/4448
2008/0301775 A1* 12/2008 Ollikainen .......... G06F 21/6272
726/3

* cited by examiner

DATA PROCESSING METHOD AND DATA PROCESSING DEVICE

BACKGROUND

1. Technical Field

The present disclosure relates to a data processing method and a data processing device.

2. Description of the Related Art

In the related art, the handing of various pieces of information and various pieces of data that are stored in an electronic medium is regarded as important, and a security technology for managing data is attracting attention. Security technologies include, for example, a data encryption technology and a secret sharing scheme (hereinafter referred to as, "secret sharing").

As a data management system that uses the secret sharing in the related art, the following data management system is known. The data management system in Japanese Patent Unexamined Publication No. 2011-248711 has a service provider system that includes a server apparatus which provides a service to an information processing system for a group of multiple user terminals. The server apparatus has a secret sharing manager, a checker, and management information. The user terminal includes a secret sharing engine.

The secret sharing manager of the server apparatus provides a secret sharing processing service, which includes a function of fragmenting a target document file into smaller pieces using a secret sharing technology, and a function of restoring the document file from the smaller pieces, to a user terminal that belongs to the group. At the time of restoration by secret sharing service processing, the checker performs processing that checks whether or not restoration is approved and thus performs processing that prevents illegitimate restoration. The management information of the server apparatus is information that can be set by the user and includes group information or scope-of-disclosure information. The group information includes an ID, domain information, or IP address information for every group unit. The scope-of-disclosure information results from associating information on a scope of disclosure in units of group with a document file in the group of user terminals.

The secret sharing engine of the user terminal accesses the secret sharing manager of the server apparatus and the secret sharing service processing is applied to the secret sharing engine.

When the document file is restored from the fragments, the information processing system for the group in which the document file is fragmented accesses the server apparatus and transmits request information. The request information includes access source information, and fragment or document file information.

Based on the management information, the checker of the server apparatus determines whether or not an ID, a domain, or an IP address of a group of access sources in the request information is included in a scope of disclosure that is associated with the document file. In a case where the result of the determination by the checker is that the ID, the domain, or the IP address is not included in the scope of disclosure, the secret sharing engine of the server apparatus does not perform the restoration processing of the document file. In a case where the result of the determination by the checker is that the ID, the domain, or the IP address is included in the scope of disclosure, the secret sharing engine performs the restoration processing. In the case where the restoration processing is performed, the information processing system for the group of access sources acquires the restored document file.

SUMMARY

The present disclosure, which is made in view of the situation described above, is to provide a data processing method and a data processing device that can improve the security in data management.

A data processing method according to the present disclosure is a data processing method in a processing device that is connected to an external storage device and that is equipped with a storage device, the method including: receiving a writing instruction to store first data in the storage device; dividing the first data into multiple pieces of division data; storing at least one or more of the pieces of division data in the external storage device; and storing second data different from the first data in the storage device, in which the second data is associated with the first data and the multiple pieces of division data.

A data processing device according to the present disclosure is a data processing device to which a data processing server is able to be connected, including: a division that generates multiple pieces of division data into which first data is divided, and that stores at least one of the multiple pieces of division data in the data processing server; a controller that generates second data different from the first data, sends the first data to the division, and outputs the second data instead of the first data; and a storage in which the second data is stored, in which the second data is associated with the first data and the multiple pieces of division data.

According to the present disclosure, the security in the data management can be improved.

DETAILED DESCRIPTION OF THE PREFERRED EMBODIMENTS

Figure 1:
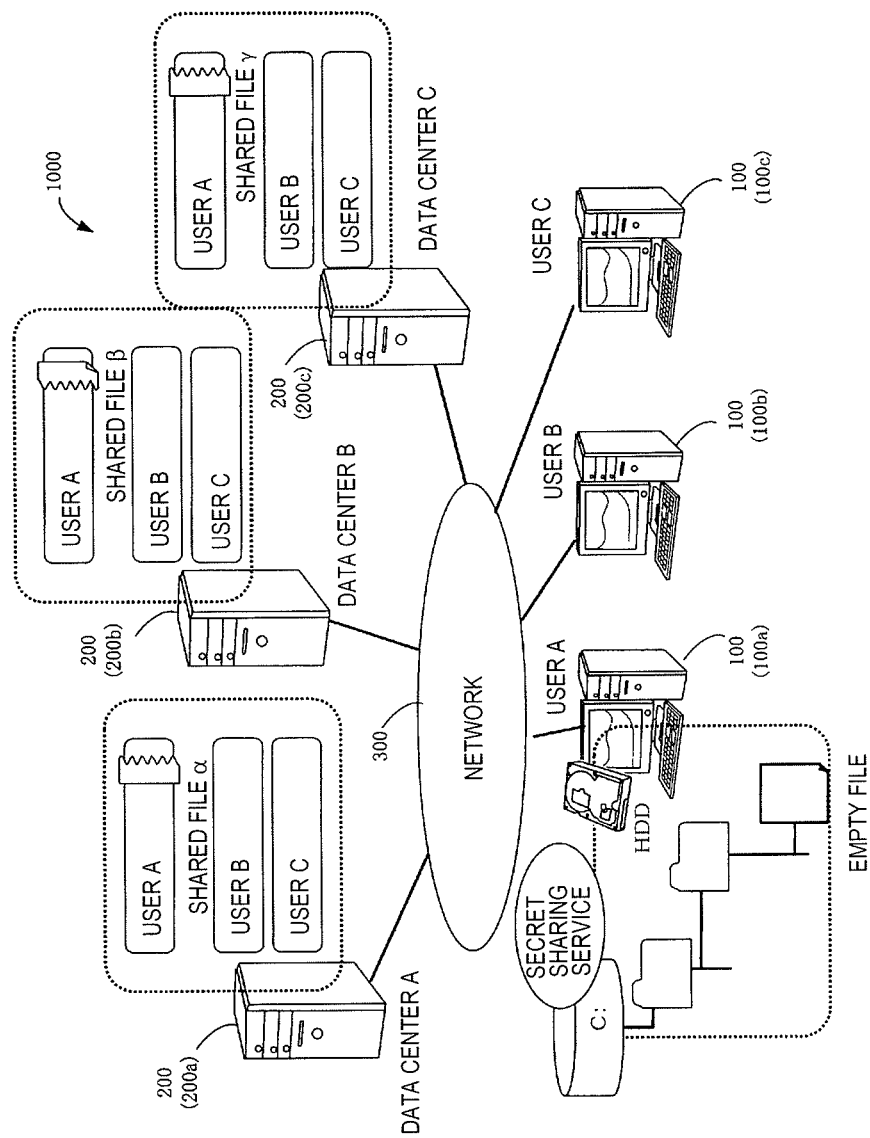
FIG. 1 is a schematic diagram illustrating a configuration example of a data management system according to a first embodiment.

Embodiments of the present disclosure will be described below referring to the drawings.

The embodiments to be described below will describe a case of using "secret sharing scheme (secret sharing)", but the application range of the present disclosure is not limit to the secret sharing. The "secret sharing" means a technology that source file (or data) is converted into multiple pieces of file (or data) which are difficult to be estimated separately, and the multiple pieces of file (or data) are divided or shared and stored. That is, the secret sharing is one of technologies for dividing data into multiple pieces of data. Therefore, the present disclosure is applicable to an entire technology for dividing data.

First Embodiment

FIG. 1 is a schematic diagram illustrating a configuration example of data management system 1000 according to a first embodiment. Data management system 1000 includes data management apparatus 100 (100a, 100b, 100c, and so forth), and data management server 200 (200a, 200b, 200c, and so forth). Data management apparatus 100 and data management server 200 are connected to each other through wireless or wired network 300 (for example, the Internet). Data management apparatus 100 is one example of a processing apparatus or of a data processing apparatus.

Data management apparatus 100 includes a magnetic storage medium (for example, a hard disk drive (HDD)) in which data is magnetically stored, as one example of a storage or of a storage device. Data management apparatus 100 performs encoding using secret sharing processing on original file (source data), and transmits shared file to each data management server 200 over network 300. Data management apparatus 100, for example, acquires the shared file over network 300, and decodes one piece of source data from multiple pieces of shared file using the secret sharing processing.

Data management apparatus 100, for example, includes a personal computer (PC), and a portable-type information terminal device (for example, a smartphone).

In FIG. 1, data management apparatus 100a is used by a user A, data management apparatus 100b is used by a user B, and data management apparatus 100c is used by a user C. However, any type of usage other than this usage may be available, and multiple users may use one data management apparatus 100.

Data management apparatus 100 performs secret sharing application processing. With the same sense of ease as is the case when causing operation encryption processing, the user can operate the secret sharing application processing and can use a secret sharing service. The application is simply also referred to as an "app."

Data management server 200, for example, retains a shared file. FIG. 1 illustrates a case where there are 3 shared files, but any value other than 3 may be satisfactory. In data management server 200, for example, a storage area is determined in advance for every user, and shared file is retained for every user. Each data management server 200 (200a, 200b, and 200c), for example, is a server apparatus that is provided in each data center (data centers A, B, and C).

Figure 2:
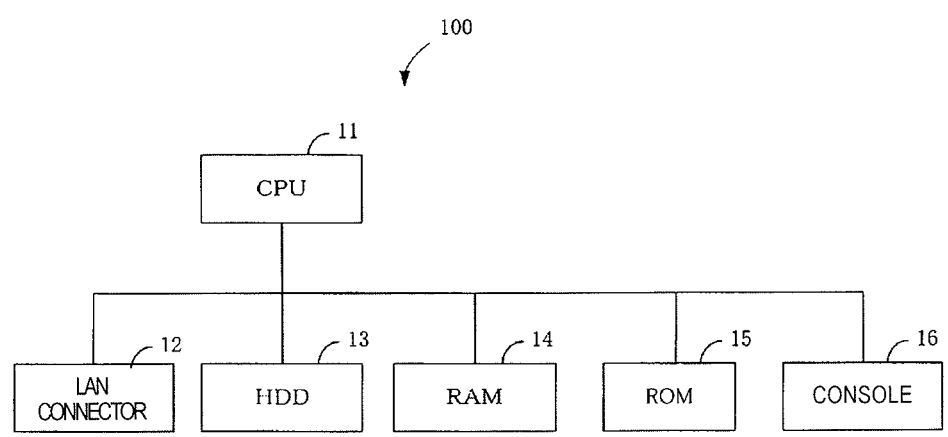
FIG. 2 is a block diagram illustrating a hardware configuration example of a data management apparatus according to the first embodiment.

FIG. 2 is a block diagram illustrating a hardware configuration of data management apparatus 100.

Data management apparatus 100 includes central processing unit (CPU) 11, local area network (LAN) connector 12, HDD 13, random access memory (RAM) 14, read only memory (ROM) 15, and console 16.

CPU 11, for example, reads a program and data from RAM 14 or ROM 15, and by executing the program, performs various processing operations (for example, various control operations, various settings, and various determination operations). The program broadly includes various programs (for example, software (soft), and an application (app)), and an operating system (OS) (for example, such programs as Windows (a registered trademark) and middleware). CPU 11 operates in operation modes including a user mode and a kernel mode.

For example, a LAN cable may be connected to LAN connector 12 and thus LAN connector 12 may be enabled to perform wired communication. LAN connector 12, for example, may include a wireless LAN adapter and thus LAN connector 12 may be enabled to perform wireless communication. LAN connector 12, for example, has a communication function of communicating various pieces of data and a file.

Various pieces of data and a file are stored in HDD 13. For example, a C drive is allocated to all portions or some portions of HDD 13. Data management apparatus 100 may include, for example, a solid state drive (SSD) as a storage instead of HDD 13, and a USB memory may be connected to data management apparatus 100 through an external I/O.

The file is configured from an aggregation of pieces of data. For example, the pieces of data stored in HDD 13 include empty data. The empty data is data that is configured from only NULL data. The empty file is configured from an aggregate of pieces of empty data.

Various pieces of data are stored in RAM 14, and for example, RAM 14 is used as a main memory. Various pieces of data (for example, data that does not need to be rewritten, and a program that is read when electrical power is applied) are stored in ROM 15.

Various operational commands from the user of data management apparatus 100 are input into console 16. Console 16 is configured from various keys, buttons, and a touch panel.

Figure 3:
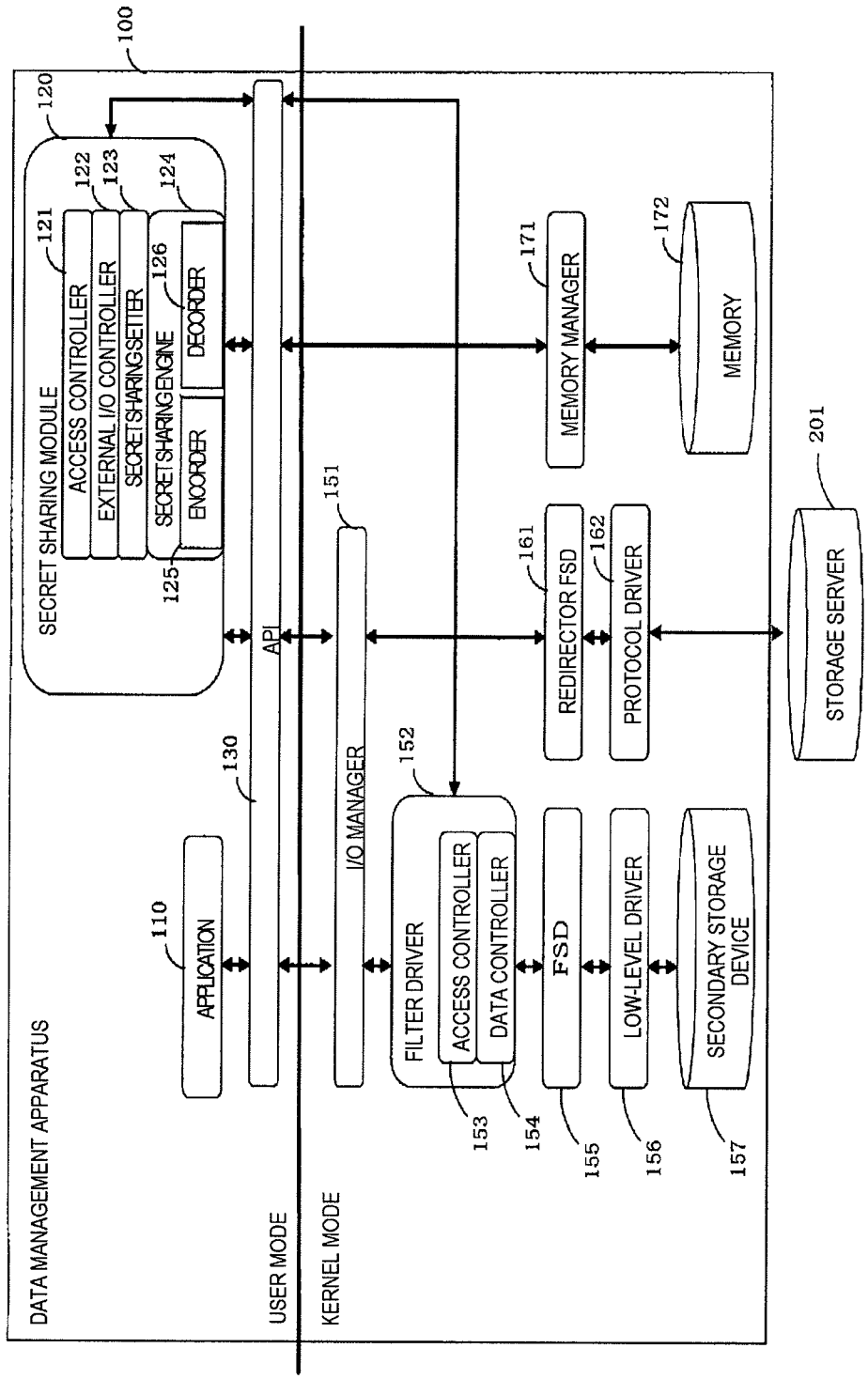
FIG. 3 is a block diagram illustrating a software configuration example of the data management apparatus according to the first embodiment.

FIG. 3 is a block diagram illustrating a software configuration example of data management apparatus 100. In FIG. 3, software components in data management apparatus 100 are illustrated hierarchically. As illustrated in FIG. 3, secondary storage device 157, storage server 201, and memory 172 are pieces of hardware. Storage server 201 is included in data management server 200.

Data management apparatus 100 includes application 110, secret sharing module 120, and application programming interface (API) 130. These components are arranged in an application area, and operate in the user mode.

Application processor 110 performs processing of various applications. The applications include, for example, utility software, document creation software, table calculation software, presentation software, database software, and mail software. In contrast with the secret sharing application (the secret sharing processing), an application that is executed by application processor 110 is also referred to as a first application.

Secret sharing module 120 includes an aggregate of software for performing the secret sharing processing, and performs processing relating to the secret sharing application. Secret sharing module 120 includes access controller 121, external I/O controller 122, secret sharing setter 123, and secret sharing engine 124.

Access controller 121 determines whether or not access to a predetermined area is possible in data management apparatus 100. In cooperation with access controller 153 in filter driver 152, access controller 121 transmits and receives data between access controller 121 and access controller 153. For example, referring to setting information retained in secret sharing setter 123, access controller 121 determines whether or not an access destination is a secret sharing-target area (for example, a drive, a folder, or a file), and transmits a result of the determination to filter driver 152.

External I/O controller 122 determines whether or not data transmission and reception is possible between secret sharing module 120 and an external storage device, and performs access control on the external storage device. The external storage device, for example, includes storage server 201 that is connected through network 300, a storage device that is connected through an USB, a storage device that is connected through a LAN, and an SD card.

Secret sharing setter 123, for example sets setting information of the secret sharing processing, and retains the setting information. Included in the setting information is, for example, information on an area that is a target for the secret sharing processing, the number of shared files, a saving destination of the shared file, a processing scheme of the secret sharing processing (a secret sharing scheme), a secret sharing ratio, a saving destination of the empty file, and compression and non-compression of the empty file. The information of stored position (address information) of the shared file and the information of stored position (address information) of the empty file are retained in such a manner that they are associated with each other. The setting information is one example of generation data for associating source file, empty file, and shared file with each other.

The saving destination of the shared file, for example, is an external storage device such as storage server 201. The secret sharing scheme, for example, includes a threshold secret sharing method ((k, n) threshold method) and a ramp-type threshold secret sharing method. The empty file, for example, includes, empty data (for example, data that is expressed as "000 . . . " (NULL)). The saving destination of the empty file, for example, is secondary storage device 157.

Secret sharing engine 124 includes at least one among encoder 125 and decoder 126. The secret sharing processing includes at least one among encoding and decoding. In the secret sharing processing, pieces of data are expanded and are executed in memory 172.

Encoder 125 generates multiple pieces of shared file from the source data using a predetermined secret sharing scheme. When performing the encoding, encoder 125 refers to the setting information retained by secret sharing setter 123. For example, encoder 125 reads on information on the saving destination of the shared file, which is included in the setting information, and transmits a shared file (or shared data that is included in the shared file) to the saving destination (for example, storage server 201) of the shared file through external I/O controller 122. Encoder 125, for example, may transmit the shared file (or the shared data that is included in the shared file), to secondary storage device 157 through API 130.

Decoder 126 generates the source data from multiple pieces of shared data using a predetermined secret sharing scheme that is used when performing the encoding. When performing the decoding, decoder 126 refers to the setting information retained by secret sharing setter 123. For example, decoder 126 reads the information on the saving destination of the shared file, which is included in the setting information, and acquires the shared file from the saving destination (for example, storage server 201) of the shared file through external I/O controller 122.

Therefore, secret sharing module 120 generates multiple pieces of shared data from the source data, and stores at least one piece of shared data in storage server 201 (one example of data management server 200).

API 130, for example, provides an interface that indicates specifications that stipulate an application call procedure and a description method. With the interface, for example, it is easy for external software (for example, an OS) to refer to one portion of a function of each application. Furthermore, API 130 transmits the data I/O manager 151 of the system area. Accordingly, the data can be used in a layer that is lower than I/O manager 151. Furthermore, API 130 sends the data to secret sharing module 120. API 130, for example, includes a Win 32 API.

Data management apparatus 100 includes I/O manager 151, filter driver 152, file system driver (FSD) 155, low-level driver 156, secondary storage device 157, redirector FSD 161, protocol driver 162, memory manager 171, and memory 172. These components are arranged in the system area and operate in the kernel mode.

I/O manager 151 manages data input and output between the kernel mode area and the user mode area in cooperation with API 130. I/O manager 151 transmits various requests (for example, an opening request, a closing request, a writing request, and a reading request) relating to a file operation from application processor 110 to a lower layer (for example, filter driver 152 and FSD 155), and receives the processing results with respect to the requests. Various requests, for example, are included in an I/O request packet (IRP) (referring to FIGS. 5 and 6 to be described below).

Filter driver 152 includes access controller 153 and data controller 154. Filter driver 152 is a driver that is arranged, for each of storage drivers, between I/O manager 151 and FSD 155. Filter driver 152 operates in cooperation with secret sharing module 120. Filter driver 152 is one example of a controller that generates second data that is different from source data (one example of first data), sends the first data to secret sharing module 120 (one example of the secret sharing or the division), and outputs the second data instead of the first data.

Access controller 153 transmits and receives data between access controller 153 and access controller 121 of secret sharing module 120. Access controller 153 inquires of secret sharing module 120 whether or not the access destination is the secret sharing-target area, using the access destination (for example, the saving destination of the file) that is included in various requests relating to a file, and receives a result of the inquiry from secret sharing module 120.

According to the present embodiment, inquiry is made to secret sharing module 120 of whether or not a file is the secret sharing-target area, in all cases, but information on whether or not the access destination is the secret sharing-target area may be stored in advance in access controller 153, and thus the inquiry may not be made in all cases.

The data controller 154 transmits and receives source data between filter driver 152 and secret sharing engine 124 of secret sharing module 120.

The data controller 154 receives a source file writing request from application processor 110. In a case where source data is data within the secret sharing-target area, the data controller 154 generates empty data instead of source data. The data controller 154 sends the generated empty data, for example, to secondary storage device 157 through FSD 155, and sends the source data (including plain-text data) to memory 172 through secret sharing module 120. The source data is data that is used for the encoding.

Data controller 154 receives an empty-file reading request from application processor 110. In a case where source data is the data within the secret sharing-target area, data controller 154 acquires the empty data, from secondary storage device 157 through FSD 155, and acquires the source data (including the plain-text data) from memory 172 through secret sharing module 120. The source data is data obtained by the decoding. Data controller 154 replaces the empty data with the source file including the source data and transmits the resulting source file to application processor 110.

Instead of the empty data, different predetermined data may be used. The predetermined data is configured from data that cannot be inferred (that is not inferred) from source data. In this case, the setting information that is retained by secret sharing setter 123 may include information for generating a predetermined file including predetermined data (for example, a random number) that cannot be inferred from the source data. The source data is included in the source file.

For source data other than the data within the secret sharing-target area, data controller 154 transmits the source data as is, to FSD 155.

FSD 155 is file systems (for example, a file allocation table (FAT) and an NT file system (NTFS)) for managing, for example, data passed from the first application and the attribute information of the passed data (file name, data size, and the like), and for retaining the information to secondary storage device 157 as a file to be handled by the first application.

In a case where the empty data is compressed in secondary storage device 157, FSD 155 retains compression information and sends compressed empty data to secondary storage device 157 through low-level driver 156.

Low-level driver 156 is a driver that is lower than FSD 155. Low-level driver 156, for example, is a hard disk driver for controlling HDD 13 included inside of data management apparatus 100. Instead of HDD 13, low-level driver 156 may control the storage server included outside of data management apparatus 100 by connecting thereto through the network.

Secondary storage device 157 is a storage device that is built into data management apparatus 100. Secondary storage devices 157, for example, include HDD 13 and an SSD.

Filter driver 152, FSD 155, low-level driver 156, and secondary storage device 157, for example, are arranged in every logical drive. The logical drives, for example, include each partition in HDD 13, the SD card, and the USB.

Redirector FSD 161 is a driver for accessing an external storage device with a data input source or a data output destination being set to be an external storage device other than secondary storage device 157.

Protocol driver 162, for example, performs protocol control in order for data management apparatus 100 to connect to storage server 201 through network 300.

Memory manager 171 manages memory 172. Memory manager 171, for example, controls writing of data (for example, shared data or source data) to memory 172, and reading the data (for example, the shared data or the source data) from memory 172.

Memory 172 is a storage device that is built into data management apparatus 100. Memory 172, for example, includes RAM 14. Memory 172 is a temporary storage in which data is temporarily stored, and is different from secondary storage device 157.

Storage server 201, for example, is included in data management server 200. For example, the shared data is transferred to storage server 201 over network 300, and is retained there. The shared data retained in storage server 201, for example, is transferred to memory 172 over network 300. Storage server 201 is one example of an accumulator.

Next, a configuration example of data management server 200 is described.

Data management server 200 is not illustrated in particular, but includes at least a communicator and an accumulator (for example, storage server 201). The communicator communicates data (for example, the shared data) between data management server 200 and data management apparatus 100 through network 300. For example, when receiving a shared data reading request from data management apparatus 100, the communicator transmits the shared data to data management apparatus 100. The accumulator accumulates pieces of data (for example, pieces of shared data).

Data management server 200 may have the same secret sharing function as data management apparatus 100. In this case, in data management server 200, a server FSD is arranged in a layer that is higher than an I/O manager which is present in data management server 200. The server FSD functions as a receptor and receives data from data management apparatus 100. In a case where, as described above, data management server 200 has the same function as data management apparatus 100, the empty file may be saved in storage server 201, and the empty file generated in data management server 200 may be transmitted to data management apparatus 100.

Next, a flow of data in data management apparatus 100 is described.

Figure 4:
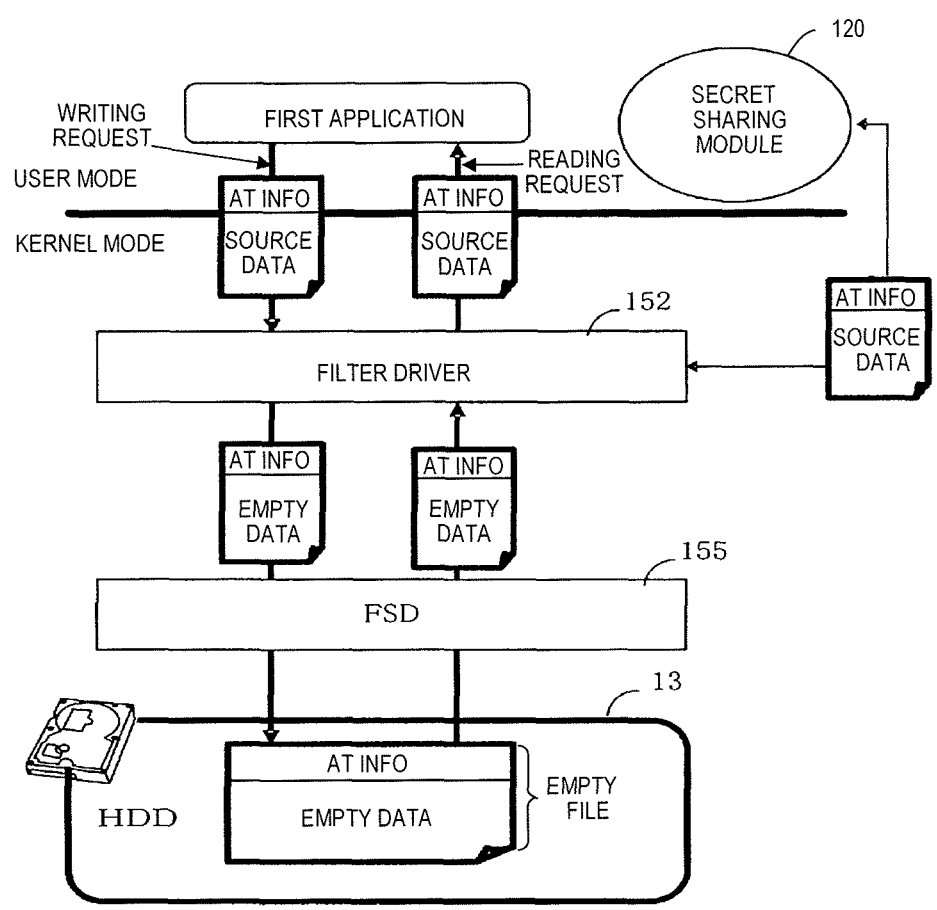
FIG. 4 is a schematic diagram illustrating an example of a flow of source data and empty data in the data management apparatus according to the first embodiment.

FIG. 4 is a schematic diagram illustrating an example of the flow of data in data management apparatus 100.

In a case where writing request (the writing request) of the source data that is included in the source file occurs through the first application, filter driver 152 receives the source data and attribute information (for example, including various pieces of information of the source data such as a source data size and a source data saving destination) of the source data, replaces the empty data with the source data, and sends attribute information of the empty data and the attribute information of the source data to FSD 155. Instead of the source file, FSD 155 retains the empty file to be handled by the first application as a file to secondary storage device 157 (for example, HDD 13) in associated with the received empty data and the attribute information of the source data. Filter driver 152 transmits the source data that is replaced with the empty data and the attribute information of the source data to secret sharing module 120. Secret sharing module 120 refers the attribute information of the source data and performs the encoding of the source data to generate multiple sharing files. One shared file may be retained, for example, in HDD 13, and may be retained in a different area (for example, storage server 201).

In a case where a source-data reading request (a reading request) occurs through the first application, filter driver 152 acquires the empty data which is included in the empty file and the attribute information of the source data from HDD 13 through FSD 155. Filter driver 152 transmits the attribute information of the source data to secret sharing module 120 to acquire the source data from secret sharing module 120. The source data is obtained by decoding from the multiple sharing files which are obtained by secret sharing module 120 with reference to the attribute information of the source data. Filter driver 152 replaces the empty data which is obtained by HDD 13 with the source data which is obtained by secret sharing module 120 to transmit the source data and the attribute information of the source data to the first application. Finally, the source data is passed in the first application without the empty data included in the empty file which is retained in HDD 13.

As shown in FIG. 4, filter driver 152 replaces the source data with the empty data or the empty data with the source data without changing the attribute information of the source data (for example, an extension (".doc") which is added to the file name of the source data by the first application). From the perspective of the first application, the file is handed without user being aware that the source data is included or not. The source data is not included in the file which is saved in HDD 13 by the writing request of the first application (the writing request). The source data is divided into multiple pieces of sharing data (or divided data), and each data is saved in an apparatus other than data management apparatus 100. However, the source data is always included in the file which is read from HDD 13 by the reading request of the first application (the reading request). The source data is decoded from the multiple pieces of shared data which are saved in the apparatus other than data management apparatus 100, respectively. The user can use the source data without being aware that the source data are divided into multiple pieces of shared data (or divided data) and each data is saved in an apparatus other than data management apparatus 100. The source data appears to the user to always be included in data management apparatus 100. The secret sharing can be used without the user being aware of the secret sharing.

Because the empty file is a value that is expressed as consecutive 0s, the data of the empty file can be efficiently compressed. As a result, an amount of the compressed data of the empty file to be saved in HDD 13 can be greatly reduced than an amount of the source data.

Furthermore, even if the empty file is not present, for example, even if the empty file is a value that is expressed as consecutive 1s, the compression can be efficiently performed.

Next, an operational example that is employed when the encoding is performed by data management apparatus 100 is described. As illustrated in FIG. 4, the sharing processing is performed through FSD 155, between filter driver 152 and secondary storage device 157, but a description of this is omitted below.

Figure 5:
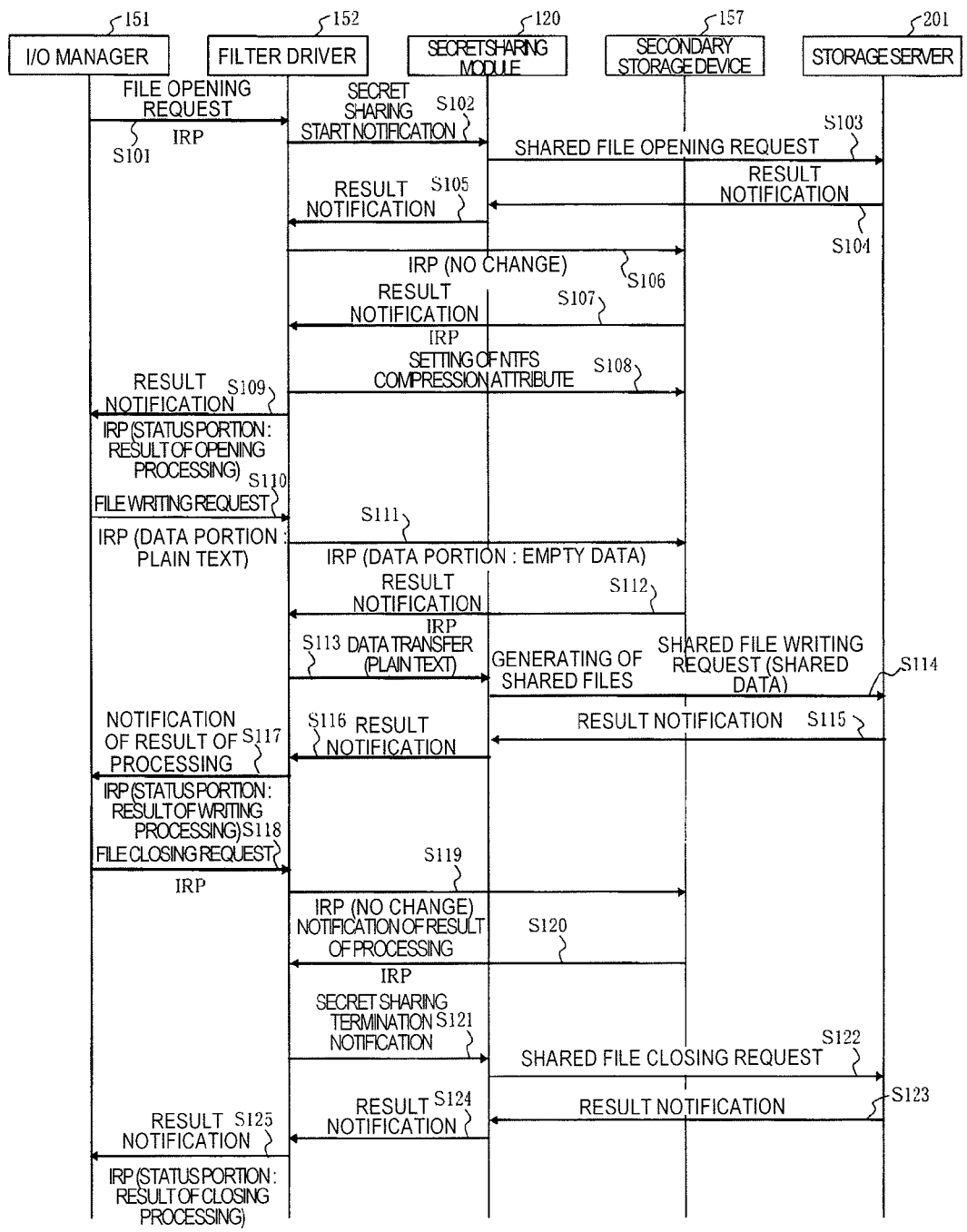
FIG. 5 is a sequence diagram illustrating an operational example that is employed when encoding is performed by the data management apparatus according to the first embodiment.

FIG. 5 is a sequence diagram illustrating an operational example that is employed when the encoding is performed by data management apparatus 100. As one example, an operational example in I/O manager 151, filter driver 152, secret sharing module 120, secondary storage device 157, and storage server 201 is described referring to FIG. 5. It is assumed that secret sharing module 120 is always activated. To be more precise, it is assumed that the secret sharing application is resident.

FIG. 5 illustrates a case where application processor 110 provides the instruction to save (or write) a predetermined file (a saving-target file for the user) in (or to) a predetermined saving place (for example, secondary storage device 157). The predetermined file, for example, is a source file that includes source data "XYZ."

First, I/O manager 151 sends a file opening request to filter driver 152 (S101). The file opening request, for example, is included in an IRP. For example, the address information (for example, information on the access destination of the empty file) that is given to the user through console 16 is included in the file opening request.

When receiving the file opening request, filter driver 152 sends a secret sharing start notification to secret sharing module 120 (S102). The secret sharing start notification is a notification that inquires whether or not the address information is the secret sharing-target area, and for example, the address information is sent to secret sharing module 120, as the secret sharing start notification.

When receiving the secret sharing start notification, secret sharing module 120 refers to the address information of the saving destination (for example, storage server 201) of the shared file from the address information, which is included in the setting information that is set by secret sharing setter 123. In a case where the address information is a secret sharing target, secret sharing module 120 transmits a shared-file opening request for opening the shared file to each storage server 201 (S103). Three storage servers 201, for example, are present in FIG. 1.

Cases where the access to storage server 201 fails, for example, include a case where the access to storage server 201 is not approved and a case where a failure is present in network 300. In this case, an error notification is sent to secret sharing module 120, as a response.

In a case where the access to storage server 201 is possible, storage server 201 receives the shared-file opening request. In response to the shared-file opening request, storage server 201 creates the shared file and opens the shared file. In response to the shared-file opening request, storage server 201 transmits information on whether or not the shared file is opened (on whether the access is possible), to secret sharing module 120, in a state of being included in a result notification (S104).

When receiving the result notification from each storage server 201, secret sharing module 120 sends the information on whether or not the access to the shared file is possible, to filter driver 152, in a state of being included in the result notification (S105). In a case where a file designated by the user is not the secret sharing target, with the result notification, it is notified that the file is not the secret sharing target, and filter driver 152 performs normal processing that does not perform the secret sharing.

Processing operations in S103 and S104 are repeated as many times as the number of shared files.

When receiving the file opening request, filter driver 152 transfers the IRP including the file opening request to a saving destination (for example, secondary storage device 157) in which the empty file with which the source file is replaced is saved (S106). The saving destination, for example, is a saving destination that is designated by the user through console 16.

When receiving the file opening request, secondary storage device 157 determines information on whether or not it is possible to save the empty file. A predetermined policy regarding whether or not it is possible to save the empty file, for example, is established in advance in secondary storage device 157. For example, a name of a user for whom it is possible to save the empty file and a period for which the empty file will be saved are included in the predetermined policy. In a case where it is possible to save the empty file, the empty file is created and the empty file is opened. In response to the file opening request, secondary storage device 157 sends information on whether or not the empty file is opened, to filter driver 152, in a state of being included in a result notification (S107). The result notification is included in the IRP.

In a case where a file system is an NTFS in data management apparatus 100, filter driver 152 performs setting of a compression attribute, which is one function of the NTFS, on secondary storage device 157 (S108). Information on the presence or absence of the compression attribute, for example, is included in the setting information that is retained by secret sharing setter 123. Accordingly, the usage capacity of secondary storage device 157 can be reduced. S108 may be omitted.

When receiving the result notification from secret sharing module 120 and secondary storage device 157, filter driver 152 sends a result notification indicating whether or not it is possible to open the file, to I/O manager 151 (S109). The result notification is included in a status portion of the IRP.

In a case where it is notified that the empty file and the shared file are opened, I/O manager 151 transmits a file writing request to filter driver 152 (S110). The file writing request is included in the IRP. For example, plain-text source data "XYZ," which is included in the source file, is stored in a data portion of the IRP. The source file, for example, has attributes of the first application, and the processing of the source file is possible with the first application.

When receiving the file writing request, filter driver 152 generates empty data (for example, "000," that is, NULL data) instead of the source data (for example, "XYZ") that is included in the IRP. Filter driver 152 replaces the generated empty data with the data portion of the IRP for storage, and sends the IRP to secondary storage device 157 (S111). Filter driver 152 sequentially sends sequentially-generated pieces of empty data to secondary storage device 157.

Secondary storage device 157 sequentially receives the pieces of empty data from filter driver 152 and writes the received pieces of empty data to the empty file. Secondary storage device 157 sends a result notification indicating whether or not the writing of the empty file to secondary storage device 157 is terminated normally, to filter driver 152 (S112). The result notification is sent in a state of being included in the IRP. In a case where in S108, the compression attribute is set to be enabled, FSD 155 compresses the empty data, and writes, for example, information "0" and information on the number of 0s, to an empty file of secondary storage device 157.

Filter driver 152 receives the IRP including the file writing request from I/O manager 151, and sends the source data that is included in the data portion of the IRP, to secret sharing module 120 (S113).

When receiving the source data from filter driver 152, secret sharing module 120 performs the encoding based on the source data (for example, "XYZ") and the setting information, and generates multiple pieces of shared data (for example, "xyz1," "xyz2," and "xyz3"). In this case, secret sharing module 120 refers to information on the saving destination of the shared file that is included in the setting information that is set by secret sharing setter 123. Secret sharing module 120 transmits a shared-file writing request for writing the shared file to each storage server 201 as the saving destination of the shared file (S114). Each piece of shared data is included in the shared-file writing request to each storage server 201.

When receiving the shared-file writing request, each storage server 201 sequentially receives the pieces of shared data from secret sharing module 120, and writes the received pieces of shared data to the shared file. Each storage server 201 transmits the result notification indicating whether or not the writing of the shared data to each storage server 201 is terminated normally, to secret sharing module 120 (S115).

For example, in a case where the source data is "XYZ," shared data "xyz1" is stored in first storage server 201, shared data "xyz2" is stored in second storage server 201, and shared data "xyz3" is stored in third storage server 201.

When receiving the result from each storage server 201, secret sharing module 120 sends information on whether or not the writing of the shared file is terminated normally, to filter driver 152, in a state of being included in a result notification (S116).

Processing operations in S114 and S115 are repeated as many times as the number of shared files (three times according to the present embodiment). Processing operations in S111 and S112 and processing operations in S113 to S116 may be reversed in order. To be more precise, the processing operations in S111 and S112 may be performed after the processing operations in S113 to S116.

When receiving the result notification from secret sharing module 120 and secondary storage device 157, filter driver 152 sends information on a result of writing the shared file, to I/O manager 151, in a state of being included in a result notification (S117). The result notification, for example, is included in the status portion of the IRP.

Writing processing operations in S110 to S117 are performed one time or multiple times. For example, as described above, in a case where a data length of the source data is short, the processing may be completed with one-time writing processing. In a case where the data length of the source data is long, because filter driver 152 divides the source data into parts and performs the encoding, the writing processing may be performed multiple times.

When the writing processing operations in S110 to S117 are terminated, I/O manager 151 transmits a file closing request to filter driver 152 (S118). The file closing request is included in the IRP.

When receiving the file closing request, filter driver 152 transfers the file closing request to secondary storage device 157 (S119). Secondary storage device 157 is the saving destination of the empty file that is replaced with the source file. The file closing request is included in the IRP.

When receiving the file closing request, secondary storage device 157 closes the empty file. In response to the file closing request, secondary storage device 157 sends information on whether or not the empty file is closed, to filter driver 152, in a state of being included in a result notification (S120). The result notification is included in the IRP.

When receiving the file closing request, filter driver 152 sends a secret sharing termination notification for terminating the encoding to secret sharing module 120 (S121). The address information of the saving destination in which the source file is saved may be included in the secret sharing termination notification.

When receiving the secret sharing termination notification, secret sharing module 120 transmits a shared-file closing request for closing the shared file to each storage server 201 (S122).

When receiving the shared-file closing request, storage server 201 closes the shared file. In response to the shared-file closing request, storage server 201 transmits information on whether or not the shared file is closed, to secret sharing module 120, in a state of being included in a result notification (S123).

When receiving the result notification from each storage server 201, secret sharing module 120 sends information on whether or not the shared file is closed, to filter driver 152, in a state of being included in the result notification (S124).

Processing operations in S121 to S124 are repeated as many times as the number of shared files.

When receiving the result notification from secret sharing module 120 and secondary storage device 157, filter driver 152 sends information on whether or not the empty file and the shared file are closed, to I/O manager 151, in a state of being included in a result notification (S125). The result notification, for example, is included in the status portion of the IRP.

According to the operational example illustrated in FIG. 5, which is employed when the encoding is performed, the shared data that results from performing the encoding on the source file can be saved to a predetermined place by the user applying the same operation as the operation that is performed when data is saved normally. The user is not particularly aware of a position of the shared data. The source file appears to the user to be managed not the empty file. The empty file, for example, is stored in a destination that is designated for the saving of the source file for the user, and is associated with the shared file by setting information which is set and retained in secret sharing setter 123.

Next, an operational example that is employed when the decoding is performed by data management apparatus 100 is described.

Figure 6:
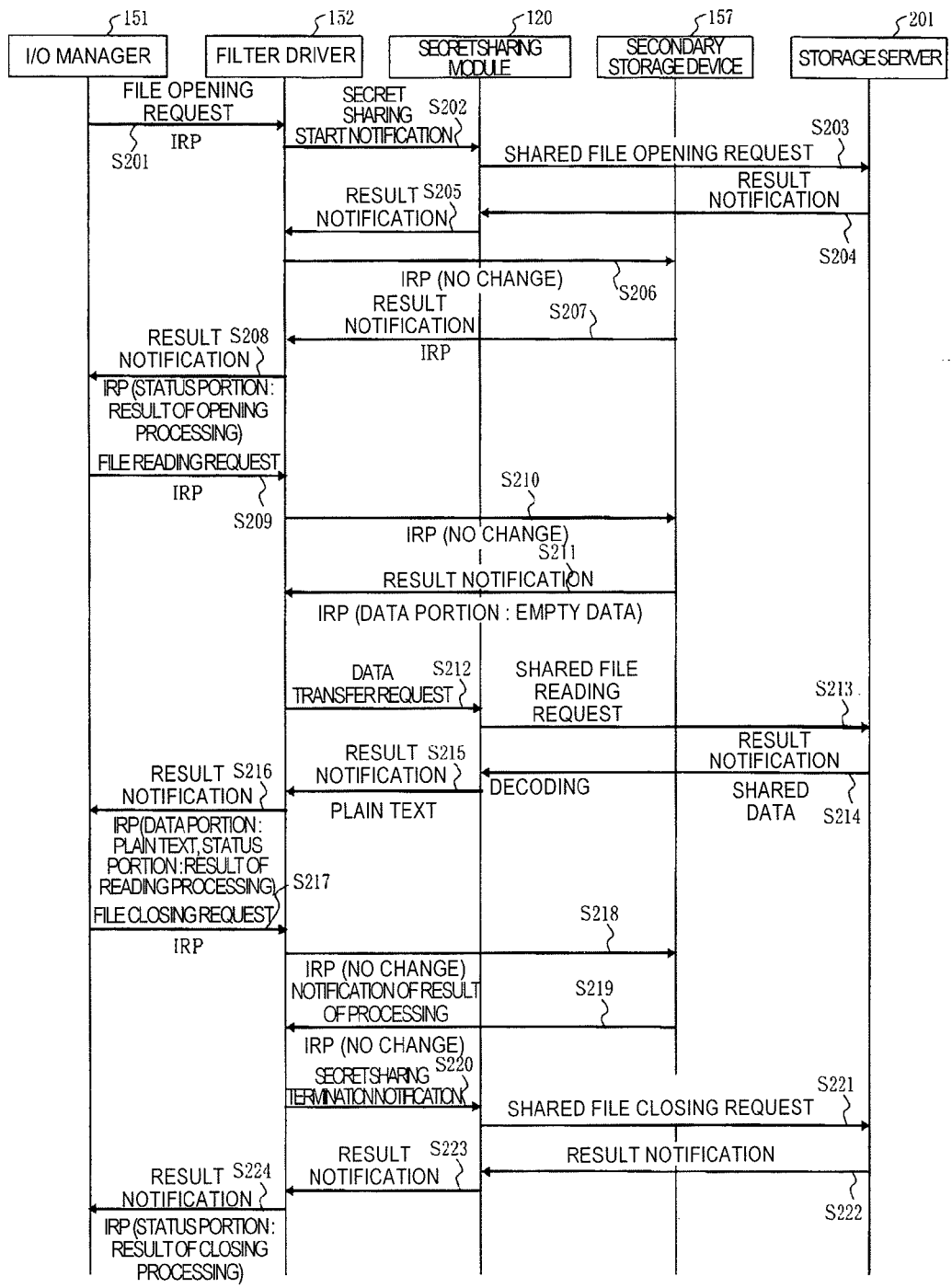
FIG. 6 is a sequence diagram illustrating an operational example that is employed when decoding is performed by the data management apparatus according to the first embodiment.

FIG. 6 is a sequence diagram illustrating an operational example that is employed when the decoding is performed by data management apparatus 100. As one example, an operational example in I/O manager 151, filter driver 152, secret sharing module 120, secondary storage device 157, and storage server 201 is described referring to FIG. 6. It is assumed that secret sharing module 120 is always activated. To be more precise, it is assumed that the secret sharing application is resident.

FIG. 6 illustrates a case where application processor 110 provides the instruction to read a predetermined file (a reading-target file for the user) from a predetermined saving place (for example, secondary storage device 157). This case, for example, includes a case where the user selects the empty file stored in secondary storage device 157 through console 16. A predetermined file, for example, is a source file that includes source data "XYZ."

First, when receiving an instruction to perform the reading from application processor 110, I/O manager 151 sends the file opening request to filter driver 152 (S201). The file opening request, for example, is included in the IRP. For example, the address information (for example, the information on the access destination of the empty file) that is given to the user through console 16 may be included in the file open request.

When receiving the file opening request, filter driver 152 sends the secret sharing start notification for starting the decoding to secret sharing module 120 (S202). The address information is included in the secret sharing start notification.

When receiving the secret sharing start notification, secret sharing module 120 refers to the address information of the saving destination (for example, storage server 201) of the shared file from the address information (the address information of the empty file), which is included in the setting information that is set by secret sharing setter 123. Secret sharing module 120 transmits the shared-file opening request for opening the shared file to each storage server 201 (S203).

In a case where the access to storage server 201 fails, an error notification is sent to secret sharing module 120, as a response, and the user is notified of an error through filter driver 152 and I/O manager 151.

In the case where the access to storage server 201 is possible, storage server 201 receives the shared-file opening request. In response to the shared-file opening request, storage server 201 opens a reading target shared file. In response to the shared-file opening request, storage server 201 transmits the information on whether or not the shared file is opened (on whether the access is possible), to secret sharing module 120, in a state of being included in the result notification (S204).

When receiving the result notification from each storage server 201, secret sharing module 120 sends the information on whether or not the access to the shared file is possible, to filter driver 152, in a state of being included in the result notification (S205). In a case where a file designated by the user is not a secret sharing target, with the result notification, it is notified that the file is not the secret sharing target, and filter driver 152 performs normal processing that does not perform secret sharing.

Processing operations in S203 and S204 are repeated as many times as the number of shared files.

When receiving the file opening request, filter driver 152 transfers the IRP including the file open request to a saving destination (for example, secondary storage device 157) in which the empty file with which a reading target file is replaced is saved (S206). The saving destination, for example, is a saving destination that is designated by the user through console 16.

When receiving the file opening request, secondary storage device 157 determines information on whether or not it is possible to read the empty file. A predetermined policy regarding whether or not it is possible to read the empty file, for example, is established in advance in secondary storage device 157. For example, a name of a user for whom it is possible to read the empty file and a period for which the empty file will be read are included in the predetermined policy. In a case where it is possible to read the empty file, the empty file is opened. In response to the file opening request, secondary storage device 157 sends the information on whether or not the empty file is opened, to filter driver 152, in a state of being included in the result notification (S207). The result notification is included in the IRP.

When receiving the result notification from secret sharing module 120 and secondary storage device 157, filter driver 152 sends information on whether or not the empty file and the shared file are opened, to I/O manager 151, in a state of being included in the result notification (S208). The result notification, for example, is included in the status portion of the IRP.

In the case where it is notified that the empty file and the shared file are opened, I/O manager 151 transmits a file reading request for reading the reading target file, to filter driver 152 (S209). The file reading request, for example, is included in the IRP.

When receiving the file reading request, filter driver 152 transfers the file reading request to secondary storage device 157 (S210). The file reading request, for example, is included in the IRP.

In response to the file reading request, secondary storage device 157 reads one portion of the empty file, to be more precise, empty data (for example, "000," that is, NULL data), and sends the empty data to filter driver 152 (S211). The empty data is stored in the data portion of the IRP, and is sent as a result notification.

When receiving the file reading request, filter driver 152 sends a data transfer request to secret sharing module 120 (S212). The data transfer request may include the information on the saving destination of the empty file.

When receiving the data transfer request, secret sharing module 120 transmits a shared-file reading request for reading the shared file that corresponds to the empty file, to each storage server 201 as the saving destination of the shared file (S213).

When receiving the shared-file reading request from secret sharing module 120, each storage server 201 sequentially reads pieces of shared data stored in the shared file. Each storage server 201 transmits the shared data, which is read, to secret sharing module 120, in a state of being included in the result notification (S214).

For example, shared data "xyz1" is read from first storage server 201, shared data "xyz2" is read from second storage server 201, and shared data "xyz3" is read from third storage server 201.

When receiving each piece of shared data from each storage server 201, secret sharing module 120 performs the decoding based on each of the pieces of the shared data (for example, "xyz1," "xyz2," and "xyz3") and the setting information, and generates the source data (for example, "XYZ") on memory 172, as one piece of decoded data. Secret sharing module 120 sends a result notification including plain-text source data "XYZ," which is generated, to filter driver 152 (S215).

Processing operations in S212 and S213 are repeated as many times as the number of shared files. Processing operations in S210 and S211 and processing operations in S212 to S215 may be reversed in order. To be more precise, the processing operations in S210 and S211 may be performed after the processing operations in S212 to S215.

Filter driver 152 receives the result notification including the empty data from secondary storage device 157, and receives the result notification including the source data from secret sharing module 120. Filter driver 152 replaces the empty data with the source data.

Filter driver 152 stores plain-text source data (for example, "XYZ") in the data portion of the IRP, and stores information on a result of reading the source data in the status portion of the IRP. Filter driver 152 sends the IRP to I/O manager 151, as the result notification (S216).

Reading processing operations in S209 to S216 are performed one time or multiple times. For example, in a case where a data length of the post-decoding source data is short, the processing may be completed with one-time reading processing. In a case where the data length of the post-decoding source data is long, because filter driver 152 performs the decoding of the source data multiple times, the reading processing may be performed multiple times.

When the reading processing operations in S209 to S216 are terminated, I/O manager 151 transmits the file closing request to filter driver 152 (S217). The file closing request is included in the IRP.

When receiving the file closing request, filter driver 152 transfers the file closing request to secondary storage device 157 (S218). Secondary storage device 157 is the saving destination of the empty file that is replaced with the reading target file. The file closing request is included in the IRP.

When receiving the file closing request, secondary storage device 157 closes the empty file. In response to the file closing request, secondary storage device 157 sends the information on whether or not the empty file is closed, to filter driver 152, in a state of being included in the result notification (S219). The result notification is included in the IRP.

When receiving the file closing request, filter driver 152 sends the secret sharing termination notification for terminating the decoding to secret sharing module 120 (S220). In the same manner as in S202, the address information of the saving destination in which the empty file is saved may be included in the secret sharing termination notification.

When receiving the secret sharing termination notification, secret sharing module 120 transmits the shared-file closing request for closing the shared file to each storage server 201 (S221).

When receiving the shared-file closing request, storage server 201 closes the shared file. In response to the shared-file closing request, storage server 201 transmits the information on whether or not the shared file is closed, to secret sharing module 120, in a state of being included in the result notification (S222).

When receiving the result notification from each storage server 201, secret sharing module 120 sends the information on whether or not the shared file is closed, to filter driver 152, in a state of being included in the result notification (S223).

Processing operations in S221 and S222 are repeated as many times as the number of shared files.

When receiving the result notification from secret sharing module 120 and secondary storage device 157, filter driver 152 sends information on whether or not the empty file and the shared file are closed, to I/O manager 151, in a state of being included in the result notification (S224). The result notification, for example, is included in the status portion of the IRP.

According to the operational example that is employed when the decoding is performed, which is described in FIG. 6, by the user applying a simple operation (for example, an operation of selecting an empty file), the source file that results from decoding the shared file can be acquired as a reading target. In this case, the first application acquires the empty file without the user being particularly aware of the position of the shared file. In reality, the source file with which the empty file is replaced is set to be the reading target, and the empty file is associated with the shared file. Therefore, the source data is decoded from the pieces of shared data that are shared with high safety and are saved, and the first application can acquire the source data.

Figure 7A:
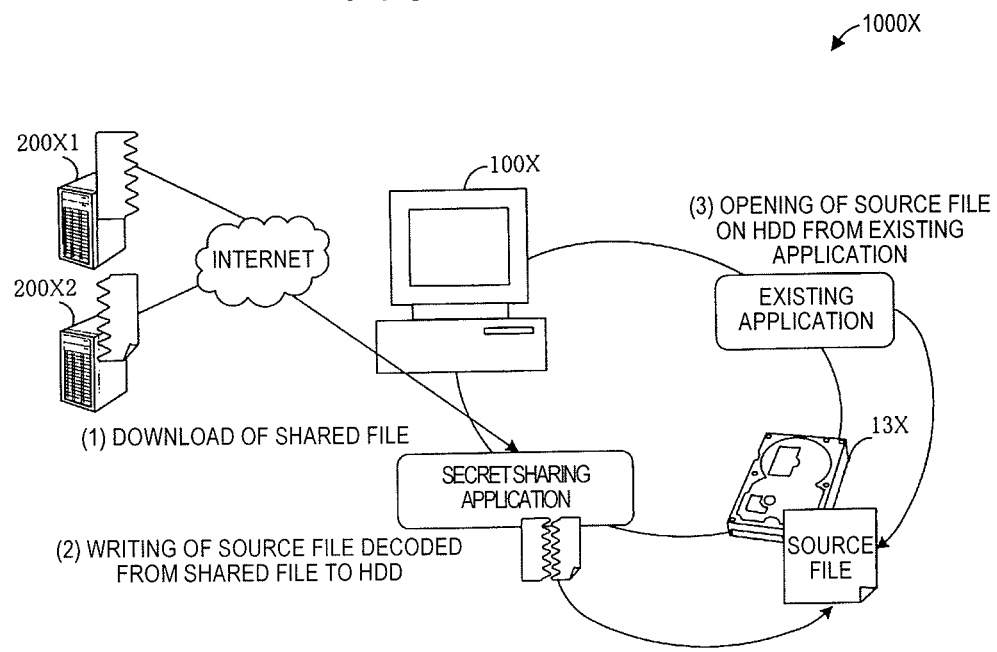
FIG. 7A is a schematic diagram illustrating an example of an operation by a data management system in a comparative example.
Figure 7B:
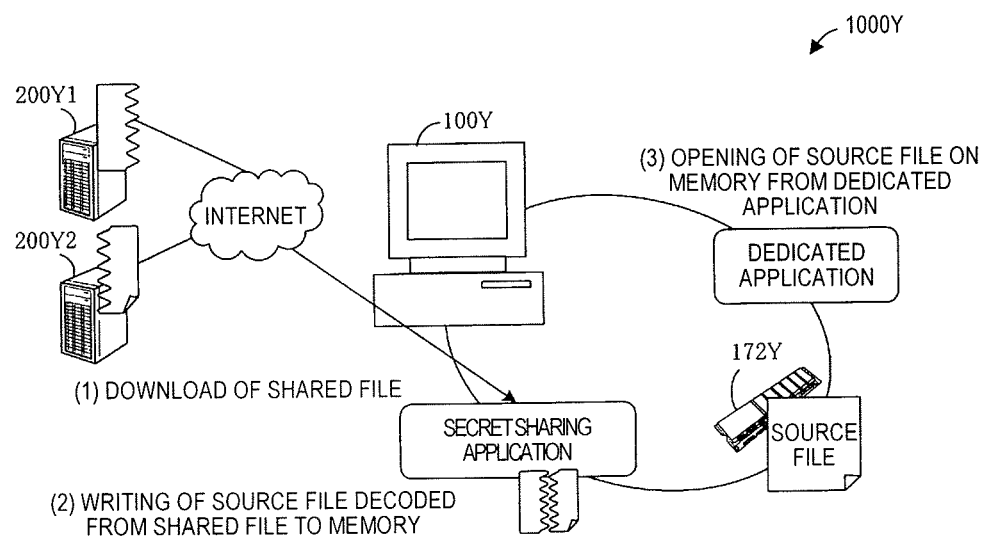
FIG. 7B is a schematic diagram illustrating an example of the operation by the data management system in the comparative example.

Next, data management system 1000 according to the present embodiment and data management systems according to a comparative example are compared with each other. FIG. 7A is a schematic diagram illustrating data management system 1000X according to the comparative example. FIG. 7B is a schematic diagram illustrating data management system 1000Y according to the comparative example.

In FIG. 7A, data management apparatus 100X downloads a shared file from data management servers 200X1 and 200X2, decodes a source file from the shared file using the secret sharing application, and writes the source file to HDD 13X.

In this case, the source file is written to HDD 13X, but, for example, because HDD 13X is a medium on which data is statically (magnetically) recoded, it is difficult to completely delete the source data that is once written to HDD 13X. In HDD 13X, there is also a likelihood that the deleted source data will be restored. Therefore, when the source data is written even temporarily to HDD 13X, there is a likelihood that the source file will be opened by an existing application. Therefore, there is a likelihood that information will be leaked and security will not be able to be achieved.

As one example in which the source data is not stored in HDD 13, in FIG. 7B, data management apparatus 100Y downloads a shared file from data management servers 200Y1 and 200Y2, decodes a source file from the shared file using the secret sharing application, and writes the source file to memory 172Y.

In this case, the source file is written to memory 172Y, but a normal application cannot access areas other than areas (for example, areas that correspond to an I/O manager, an FSD, a low-level driver, and a secondary storage device (for example, a HDD) in FIG. 3) in a specific direction through API 130. To be more precise, the normal application cannot directly access memory 172Y. For this reason, in order to open the source file that is written to memory 172Y, there is a need to prepare a dedicated application that can directly access memory 172Y, and an available application is limited.

In contrast, in data management system 1000, because instead of the source file, the empty file is stored, for example, in secondary storage device 157 (for example, HDD 13), the risk of information leakage due to the storing of the source file in secondary storage device 157, can be reduced. Because a normal application does not need to directly access memory 172, the normal application, as is, can be used.

Furthermore, according to the present embodiment, the source data included in the source file is written to memory 172 when performing the secret sharing processing. However, for example, data is statically (electrically) stored in memory 172 and safety is achieved compared with secondary storage device 157. To be more precise, when the source data included in the source file is deleted from memory 172, the source file is very difficult to restore.

Furthermore, instead of retaining secondary storage device 157, a predetermined file (for example, an empty file) that has no relation with the source file is retained in secondary storage device 157. The empty file is linked to the shared file that results from performing the encoding on the source file by the setting information which is set and stored in secret sharing setter 123.

A method in which one shared file is used instead of the empty file may also be considered, but in this case, both of the first application and the secret sharing application access the shared file. However, in a general system, two applications cannot access one file at the same time. For this reason, according to the present embodiment, by separating the empty file that the first application accesses from the shared file that the secret shared application accesses, the two files can also be used as usual in a general system.

Therefore, without referring to the source file on memory 172 using a dedicated application, based on the access to the empty file stored in secondary storage device 157, multiple shared files can be acquired and the source file can be acquired from the multiple shared files.

In this manner, because the empty file, like a general file, can be stored in secondary storage device 157, a secret sharing service can be used with the same ease as is the case when an encrypted file is stored in secondary storage device 157. Furthermore, because the source file is not written to secondary storage device 157 (for example, the HDD 13), the likelihood of restoring the source file can be reduced and the security can be improved.

The empty file may be retained in storage server 201. In this case, in storage server 201, the empty file is received by the server FSD and is retained in the secondary storage device of storage server 201.

Second Embodiment

Figure 8:
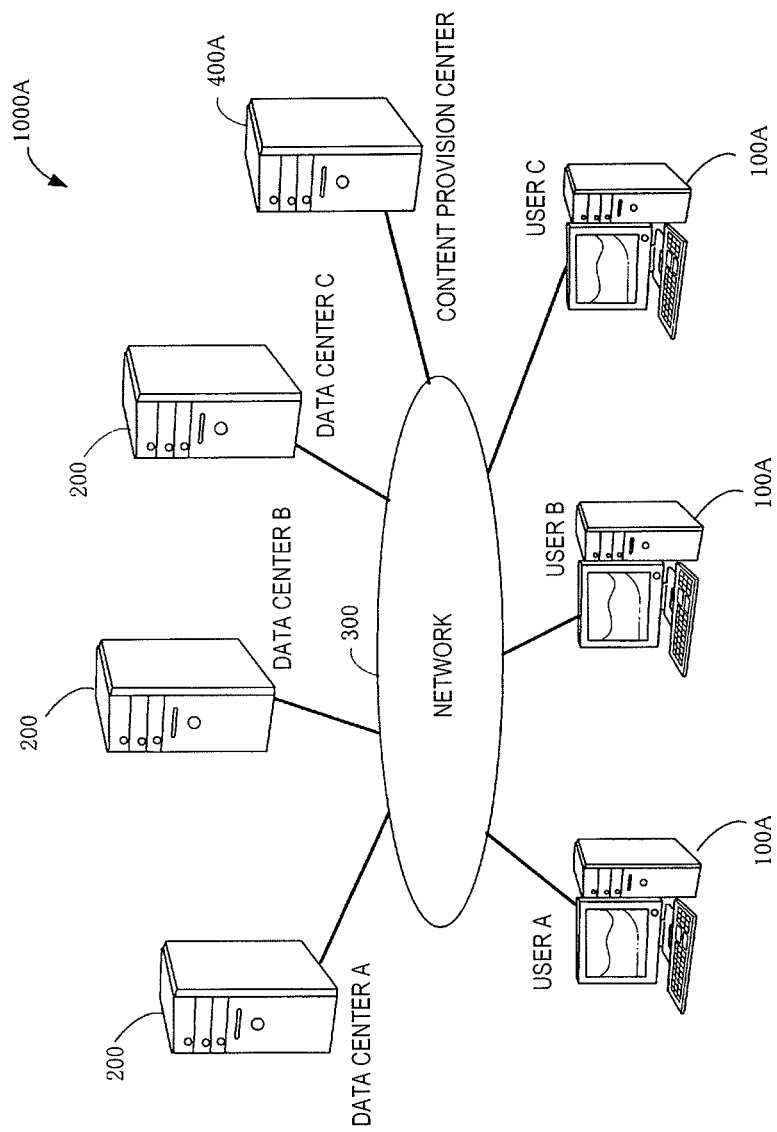
FIG. 8 is a schematic diagram illustrating a configuration example of a data management system according to a second embodiment.

FIG. 8 is a schematic diagram illustrating a configuration example of data management system 1000A according to a second embodiment. Data management system 1000A includes data management apparatus 100A, data management server 200, and content delivery server 400A. Data management apparatus 100A, data management server 200, and content delivery server 400A are connected to one another through wireless or wired network (for example, the Internet) 300. Data management server 200 may be omitted. Content delivery server 400A may be made up of one data management server 200.

In data management system 1000A in FIG. 8, the same constituent elements as those of data management system 1000 illustrated in FIG. 1 are given the same reference numerals and descriptions thereof are omitted or simplified.

Data management apparatus 100A has the same configuration as data management apparatus 100 illustrated in FIG. 3.

In data management apparatus 100A, external I/O controller 122 causes a setting file (a batch file) that includes server setting information which is generated by content delivery server 400A and one portion of the shared file to be received from content delivery server 400A.

When the setting file received from content delivery sever 400 A is executed on data management apparatus 100 A, data management apparatus 100A sets setting information relating to the secret sharing processing to secret sharing setter 123 based on the sever setting information which is included in the setting file received from content delivery server 400A, and saves one portion of shared file received from content delivery server 400A to a predetermined saving place (for example, storage server 201 or secondary storage device 157).

Content delivery server 400A delivers content over network 300. Items of content broadly include, for example, image data (for example, includes a moving image and a still image), video data, music data, sound data, and document data. For hardware configuration, content delivery server 400A, like data management apparatus 100A, includes, for example, a CPU, a LAN connector, a HDD, a RAM, and a ROM.

Figure 9:
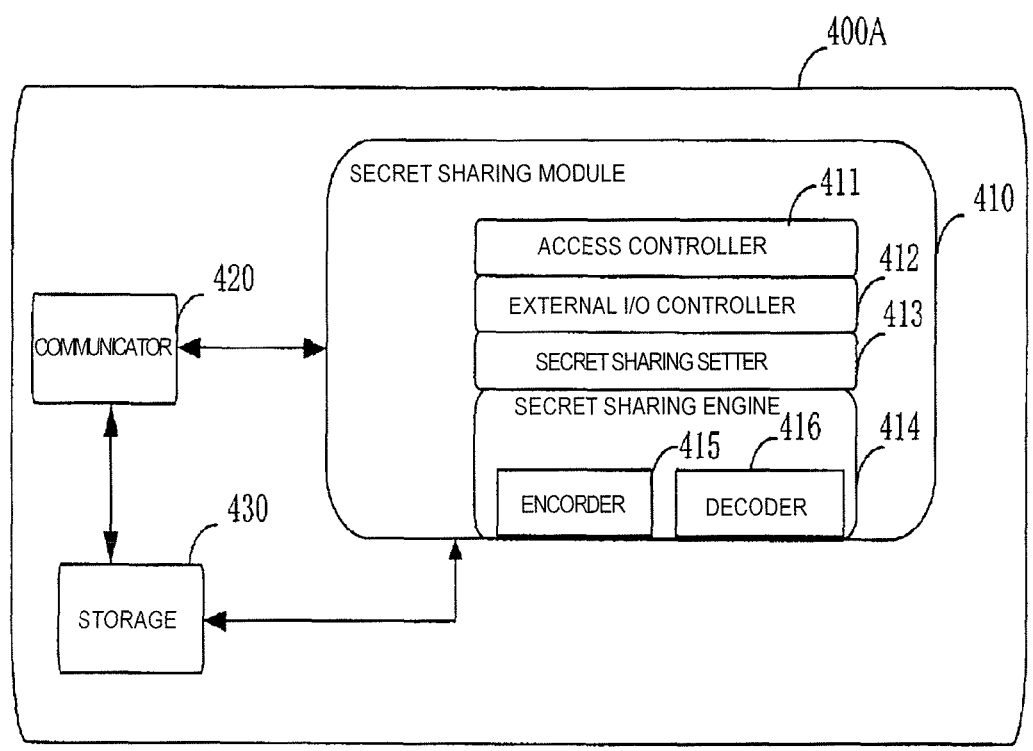
FIG. 9 is a block diagram illustrating a configuration example of a content delivery server according to the second embodiment.

FIG. 9 is a block diagram illustrating a configuration example of content delivery server 400A. Content delivery server 400A includes secret sharing module 410, communicator 420, and storage 430. Content delivery server 400A is not illustrated in detail, but has the same hardware configuration as data management apparatus 100.

Secret sharing module 410 includes access controller 411, external I/O controller 412, secret sharing setter 413, and secret sharing engine 414. Secret sharing module 410 performs the secret sharing processing on the source data that makes up content. Secret sharing engine 414 includes encoder 415 and decoder 416.

Access controller 411 has the same configuration and function as access controller 121 of data management apparatus 100. External I/O controller 412 has the same configuration and function as external I/O controller 122 of data management apparatus 100. Secret sharing setter 413 has the same configuration and function as secret sharing setter 123 of data management apparatus 100. Secret sharing engine 414 has the same configuration and function as secret sharing engine 124 of data management apparatus 100. Encoder 415 has the same configuration and function as encoder 125 of data management apparatus 100. Decoder 416 has the same configuration and function as decoder 126 of data management apparatus 100.

Communicator 420 communicates various pieces of data (for example, the shared data) between content delivery server 400A and data management apparatus 100 over network 300. Various pieces of data, and files (for example, shared data, empty data, a shared file, and a setting file) are stored in storage 430. Storage 430 has the same configuration as secondary storage device 157 of data management apparatus 100.

Next, one example of a data flow and of an operation in data management system 1000A is described.

Figure 10:
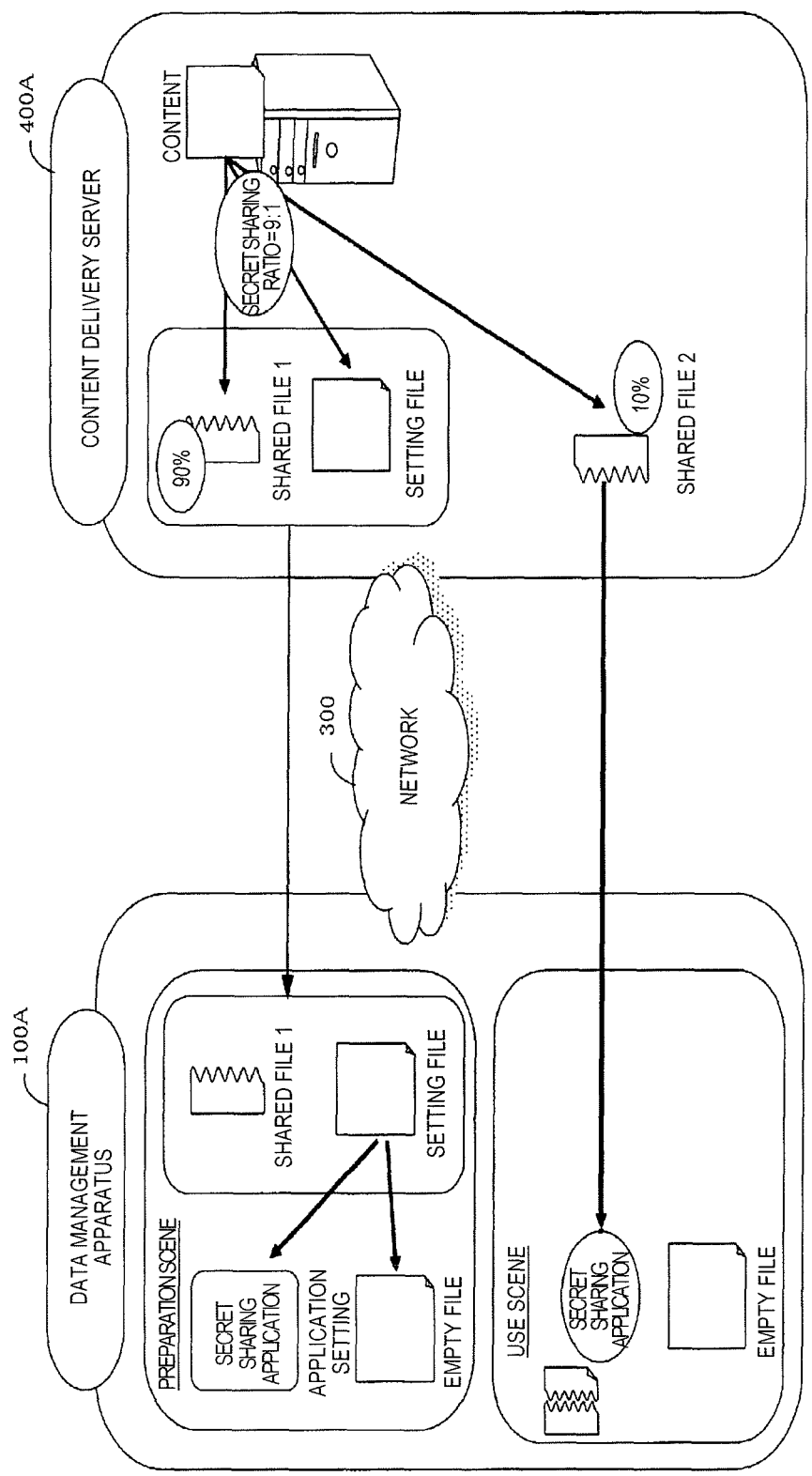
FIG. 10 is a schematic diagram illustrating one example of a flow of data between the content delivery server and a data management apparatus according to the second embodiment.

FIG. 10 is a schematic diagram illustrating one example of a flow of data between content delivery server 400A and data management apparatus 100A in data management system 1000A.

The operation of data management system 1000A is categorized, for example, into an operation in a content preparation scene and an operation in a content use scene. In the preparation scene, the encoding is performed by content delivery server 400A on the source data relating to the content, and delivery data including the shared data is transmitted to data management apparatus 100. In the preparation scene, the delivery data is received by data management apparatus 100A, the empty file and the shared file relating to the content are retained in a predetermined saving place, and predetermined information (setting information) necessary for performing the secret sharing processing is set. In the use scene, the decoding is performed by data management apparatus 100A on the shared file relating to the content, and a content file is obtained as the source file.

In content delivery server 400A in FIG. 10, encoder 415 performs the encoding on the source file as the content file, and generates two shared files. A secret sharing ratio of the secret sharing, for example, is shared file 1:shared file 2=9:1. A different secret sharing ratio may be employed, the number of shared files may be 3 or greater, and one portion of the shared file may be retained in storage server 201 of data management server 200.

In content delivery server 400A, in a case where encoder 415 performs the encoding, the empty file may be generated and may not be generated by filter driver 152 which is not illustrated. However, secret sharing setter 413 retains generation information for generating the empty file. Generation information on the empty file may be retained in advance, as the setting information, by secret sharing setter 413, and based on information, which is input when performing the encoding, may be generated by secret sharing setter 413.

Secret sharing setter 413 generates the server setting information. The server setting information, for example, includes the generation information on the empty file and information for generating the setting information that is used by secret sharing setter 123 of data management apparatus 100A. The server setting information includes, for example, pieces of information, such as the generation information on the empty file, the number of shared files, the saving destination of the shared file, the secret sharing scheme, the secret sharing ratio, the saving destination when generating the empty file, the compression and non-compression of the empty file, and attribute information on the source file. The server setting information may be generated when the encoding is performed by encoder 415, and for example, the user may set the server setting information in advance through console 16. The server setting information is one example of the generated data for associating the source data, the empty data, and the shared data with one another.

Secret sharing setter 413 stores the generated server setting information in the setting file (for example, a batch file) and retains the setting file in storage 430. Multiple shared files (for example, shared file 1 and shared file 2) generated by the encoding and the setting file are retained in storage 430.

Shared file 1 and the setting file, which are stored in storage 430, for example, are transmitted to data management apparatus 100A in response to a transmission request from data management apparatus 100A in the preparation scene. Shared file 2, which is stored in storage 430, for example, is transmitted to data management apparatus 100A in response to the transmission request from data management apparatus 100A in the use scene.

Figure 11:
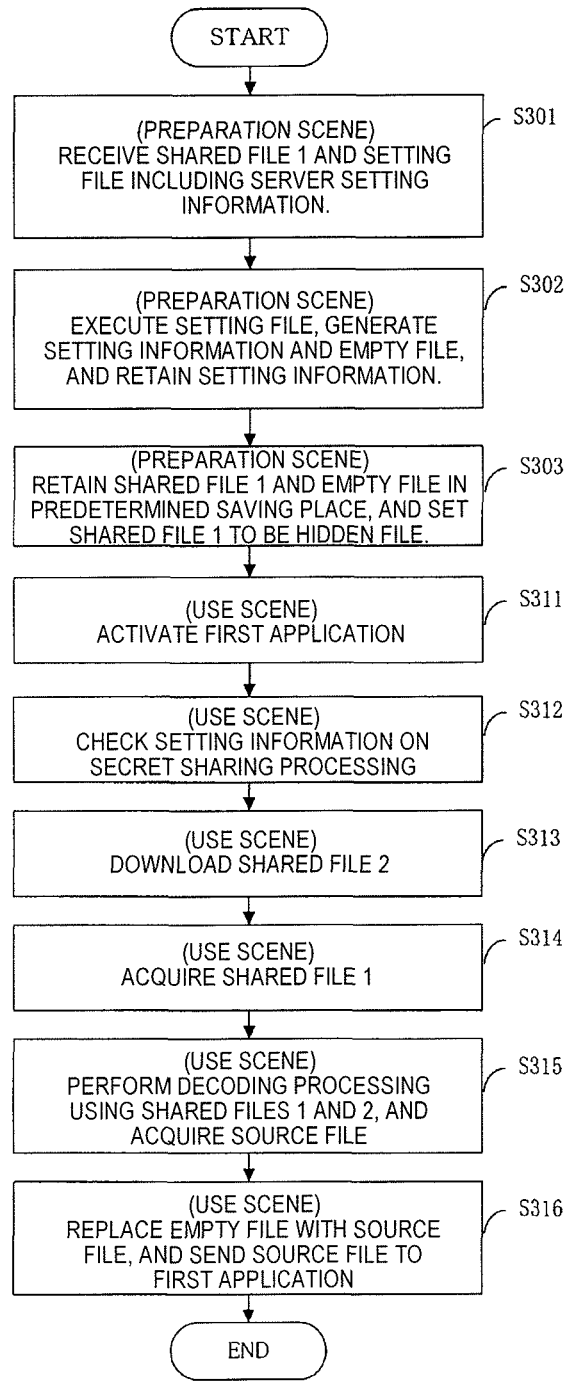
FIG. 11 is a flowchart illustrating an operational example of the data management apparatus according to the second embodiment.

FIG. 11 is a flowchart illustrating an example of an operation by data management apparatus 100A. In FIG. 11, S301 to S303 are processing operations in the preparation scene, and S311 to S316 are processing operations in the use scene. It is assumed that secret sharing module 120 is always activated. To be more precise, it is assumed that the secret sharing application is resident.

In data management apparatus 100A, for example, when through the console 16, the user provides an instruction to transmit the content that is delivered by content delivery server 400A, external I/O controller 122 causes the transmission request to be transmitted and causes a delivery file relating to the content to be received from content delivery server 400A. The delivery file includes shared file 1 and the setting file that are retained in storage 430 of content delivery server 400A.

Subsequently, data management apparatus 100A performs batch processing using the setting file until the processing of the first application relating to the content is performed by application processor 110. With the batch processing, the empty file to which an extension that is associated with the first application (that is, processing is possible by the first application) is added, and the setting information that is used when secret sharing setter 123 of secret sharing module 120 performs the decoding are generated based on the server setting information that is included in the setting file. The setting information includes the setting information relating to the secret sharing processing performed by content delivery server 400A, such as the saving place of shared file 2, and is retained by secret sharing setter 123 (S302).

By the setting information being retained in secret sharing setter 123, predetermined information necessary for executing the secret sharing application is set. The setting information includes, for example, pieces of information, such as the saving destinations of shared files 1 and 2, the saving destination of the empty file, and the secret sharing scheme.

Secret sharing setter 123 causes the empty file and shared filed 1 to be retained in a predetermined saving destination (for example, secondary storage device 157) that is designated by the setting information. The saving destinations of the empty file and shared filed 1 may be able to be arbitrarily set by the user and may be automatically set such as when the saving destination is generated in the same place as the setting file. Furthermore, it is desirable that secret sharing setter 123 sets the shared file, retained in a predetermined saving destination, to be a hidden file (S303). Accordingly, a state which the user cannot check shared file 1 is attained.

According to an example of an operation by data management apparatus 100A in the preparation scene, one portion of the shared file and the setting file are acquired from content delivery server 400A, and by executing the setting file, the generation of the empty file and the setting and retaining of the setting information can be performed. Accordingly, in data management apparatus 100A, the same state as a state that results after the encoding according to the first embodiment is performed is attained. To be more precise, the empty file is retained in a predetermined saving destination (for example, secondary storage device 157), the shared file is retained in a predetermined saving destination (for example, secondary storage device 157 and storage server 201), and the empty file is associated with the shared file.

After the preparation scene is terminated, application processor 110 activates the first application (S311). The activation of the first application, for example, is performed in a case where the user clicks on the empty file through console 16. After the activation of the first application, processing that is equivalent to the processing in FIG. 6 is started.

In a case where the empty file is retained in the secret sharing-target area, secret sharing module 120 refers to setting information which is saved in the predetermined saving destination (for example, secondary storage device 157) through filter driver 152 (S312).

External I/O controller 122 requests content delivery server 400A to transmit the shared data that is included in shared file 2. External I/O controller 122 causes the shared data that is included in shared file 2, to be downloaded from content delivery server 400A (S313, which is equivalent to S214 in FIG. 6).

Secret sharing module 120 refers to the setting information, and acquires the shared data that is included in shared file 1, from the saving designation (for example, secondary storage device 157) of shared file 1 (S314). Accordingly, in data management apparatus 100A, data of the shared file 1 and data of shared file 2 make a pair.

Decoder 126 refers to the setting information retained in secret sharing setter 123, and performs the decoding using the shared data of shared file 1, which is acquired, and the shared data of shared file 2 (S315).

Filter driver 152 acquires the empty data that is included in the empty file from secondary storage device 157, and acquires the source data obtained by the decoding from secret sharing module 120. Filter driver 152 replaces the empty data that is included in the empty file with the source data, and sends the obtained source file to application processor 110 (S316, which is equivalent to S216 in FIG. 6). Accordingly, application processor 110 can obtain the source file.

According to the example of the operation by data management apparatus 100A in the use scene, because shared files 2 that are arranged in a state of being shared are acquired in the use scene, one portion of the shared file is lacking in the preparation scene and the security can be achieved. Because only with an operation of selecting the empty file (for example, only with the clicking-on of the empty file) as a user operation, the download of insufficient shared file 2, the decoding, and the replacement of the empty file with the source file are performed, the content can be enjoyed in a simple and safe manner.

Furthermore, for example, authentication timing for content requiring authentication, such as pay content, can be set arbitrarily. For example, the authentication may be performed in the preparation scene, and the authentication may be performed immediately before the use scene.

Processing operations in S311 to S316 are described in a simplified manner, but a detailed operation in the use scene is the same as in the operational example that is employed when performing the decoding illustrated in FIG. 6.

Furthermore, secret sharing module 120 may collectively perform processing operations up to and including the processing (up to S316) in the use scene by performing the execution of the setting file in S302.

Because with data management apparatus 100A, the source data of the content is processed in a shared manner, data management apparatus 100A can receive the delivery file in a safe manner, and can acquire one portion of the shared file. Furthermore, by executing the setting file that is included in the delivery file, the empty file and the setting information can be acquired in the same manner as in the case where data management apparatus 100A performs the encoding of the source data of the content. In a case where data management apparatus 100A executes the content in the use scene, the content can be enjoyed in an easy and safe manner in the same manner as in the case when the decoding according to the first embodiment is performed.

Data management apparatus 100A may not have a encoding function if it does not have encoder 125. Content delivery server 400A may not have a decoding function. Data management apparatus 100A or data management server 200 may operate as content delivery server 400A.

Third Embodiment

A third embodiment is a modification example of the second embodiment.

Figure 12:
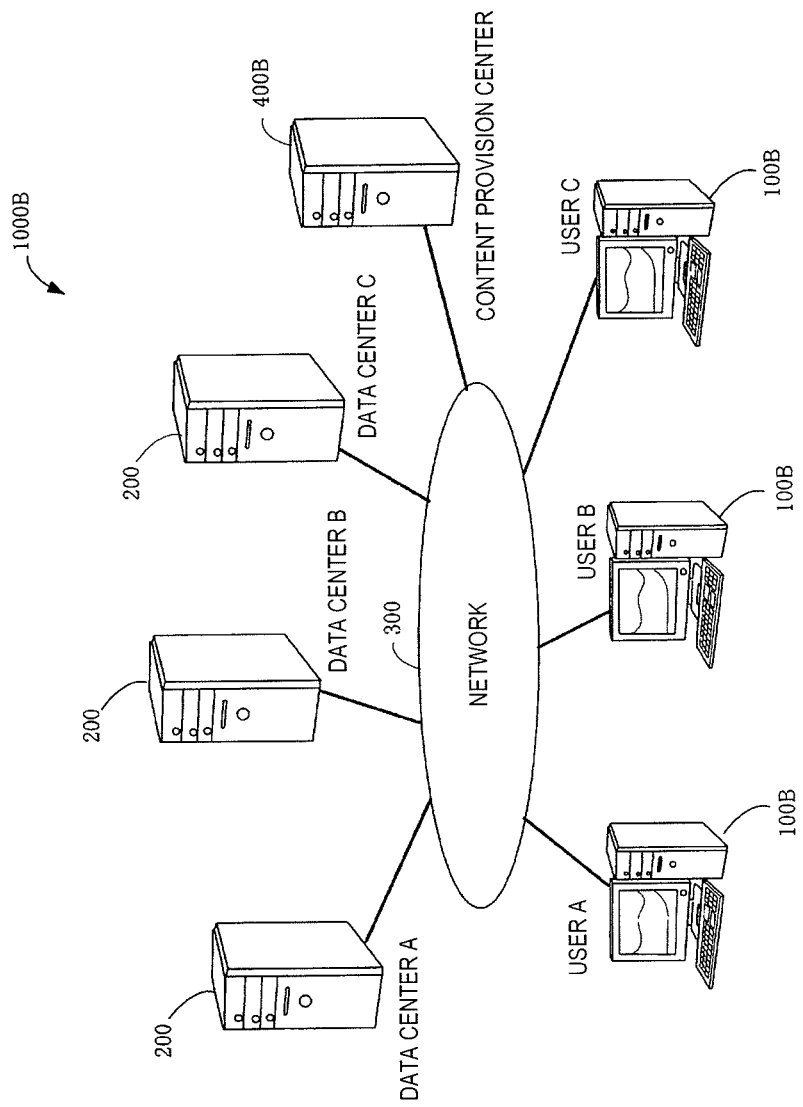
FIG. 12 is a schematic diagram illustrating a configuration example of a data management system according to a third embodiment.

FIG. 12 is a schematic diagram illustrating a configuration example of data management system 1000B according to the third embodiment. Data management system 1000B includes data management apparatus 100B, data management server 200, and content delivery server 400B. Data management apparatus 100B, data management server 200, and content delivery server 400B are connected to one another through wireless or wired network (for example, the Internet) 300. Data management server 200 may be omitted. Content delivery server 400B may be made up of one data management server 200.

Because a configuration of data management apparatus 100B is the same as the configuration of data management apparatus 100A, a description of the configuration is omitted. Because a configuration of content delivery server 400B is the same as the configuration of content delivery server 400A, a description of the configuration is omitted.

When data management system 1000B is compared with data management system 1000A, differences are as follows. In content delivery server 400B, in a case where the encoding is performed by the encoder 415, the filter driver which is not illustrated generates the empty file and the shared file and the empty file are retained in storage 430. Communicator 420 transmits the empty file, not the setting file including an instruction to generate the empty file, to data management apparatus 100B. Data management apparatus 100B receives the delivery file including the empty file and the shared file from content delivery server 400B.

Next, an example of the operation by data management apparatus 100B is described.

Figure 13:
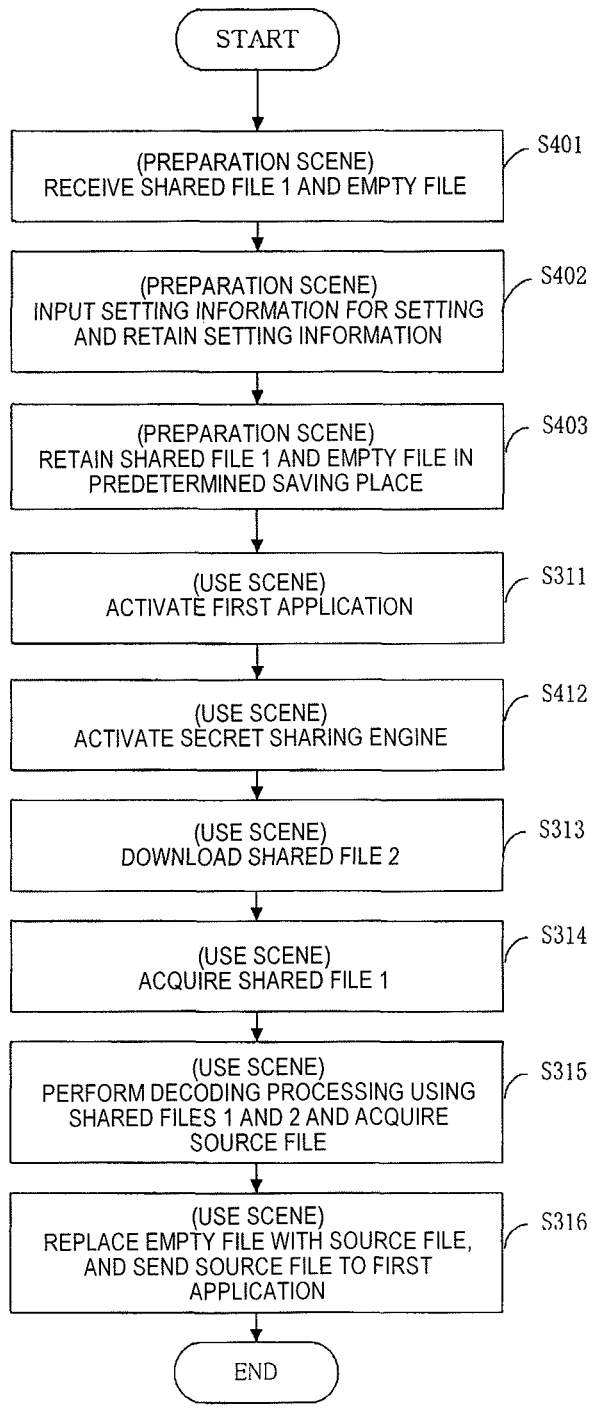
FIG. 13 is a flowchart illustrating an operational example of a data management apparatus according to the third embodiment.

FIG. 13 is a flowchart illustrating the example of the operation by data management apparatus 100B. In FIG. 13, the same processing as that performed by data management apparatus 100A illustrated in FIG. 11 is given the same step numbers, and a description thereof is omitted or simplified. It is assumed that access controller 121, external I/O controller 122, and secret sharing setter 123, other than secret sharing engine 124 of secret sharing module 120, are always activated (resident), and that secret sharing engine 124 is not activated when starting the processing in FIG. 13.

In the preparation scene, external I/O controller 122 of data management apparatus 100B causes shared file 1 and the empty file to be received from content delivery server 400B (S401).

A setting operation (for example, an operation of setting the saving destination of the shared file and the saving destination of the empty file) relating to the secret sharing processing is applied to console 16. Secret sharing setter 123 sets and retains the setting information in accordance with the setting operation that is applied to console 16 (S402).

Secret sharing setter 123 causes the received empty file to be retained in a predetermined saving destination (for example, secondary storage device 157) that is designated by the setting information (S403). Secret sharing setter 123 causes received shared file 1 to be retained in a predetermined saving destination (for example, secondary storage device 157) that is designated by the setting information (S403).

In the use scene, data management apparatus 100B performs processing operations in S311, and S313 to S316 in the same manner as data management apparatus 100A. However, in FIG. 13, instead of S312, processing in S412 is performed. In S412, filter driver 152 accesses secret sharing module 120, and activates secret sharing engine 124.

With data management apparatus 100B, the one portion of the shared file and the empty file are acquired from content delivery server 400B, and the setting information (for example, information on the saving destination of each file) is set and retained. Accordingly, the same state as in the case after the encoding according to the first embodiment is performed is attained. To be more precise, the empty file is retained in a predetermined saving destination (for example, secondary storage device 157), one portion of the shared file is retained in a predetermined saving destination (for example, storage server 201) and the empty file is associated with the shared file. Furthermore, because information on the saving destination of each file is determined by a user's intention, desired setting information can be set and retained.

Fourth Embodiment

A fourth embodiment is a modification example of the second embodiment.

Figure 14:
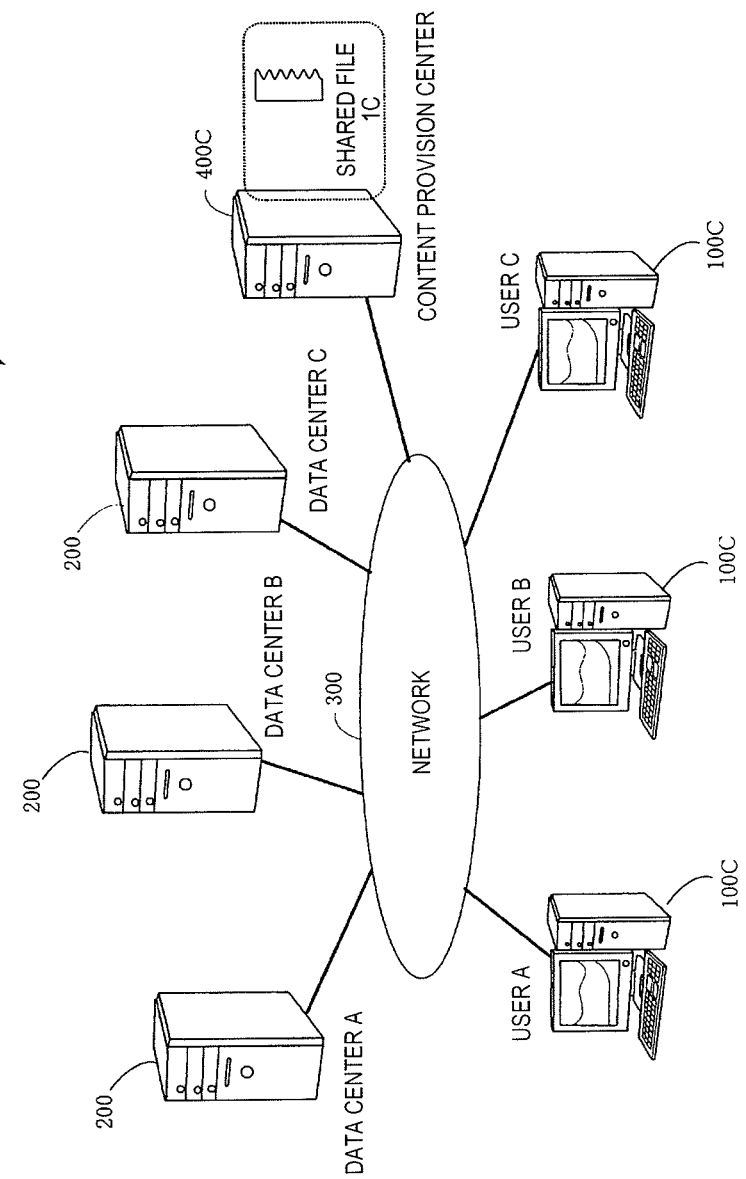
FIG. 14 is a schematic diagram illustrating a configuration example of a data management system according to a fourth embodiment.

FIG. 14 is a schematic diagram illustrating a configuration example of data management system 1000C according to the fourth embodiment. Data management system 1000C includes data management apparatus 100C, data management server 200, and content delivery server 400C. Data management apparatus 100C, data management server 200, and content delivery server 400C are connected to one another through wireless or wired network (for example, the Internet) 300. Data management server 200 may be omitted. Content delivery server 400C may be made up of one data management server 200.

When data management system 1000C is compared with data management system 1000A, differences are as follows. Content delivery server 400C transmits shared file 1C, as the delivery file, to data management apparatus 100C.

Figure 16A:
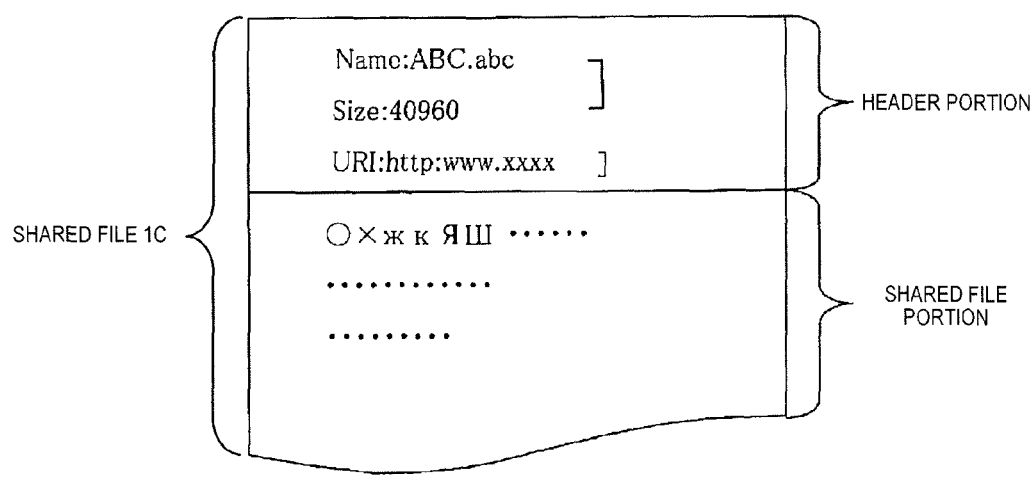
FIG. 16A is a schematic diagram illustrating an example of a format configuration of a shared file according to the fourth embodiment.

Shared file 1C, for example, may be a shared file that includes the server setting information in a header portion of shared file 1 (refer to FIG. 16A). Shared file 1C, for example, may be a shared file that includes the server setting information in a header portion of the source file, and that is obtained by the encoding on all the source files (refer to FIG. 16B).

Data management apparatus 100C includes secret sharing module 120C instead of secret sharing module 120 when compared with data management apparatuses 100, 100A, and 100B. In addition to a configurator that is included in secret sharing module 120, secret sharing module 120C includes header analyzer 127.

Figure 15:
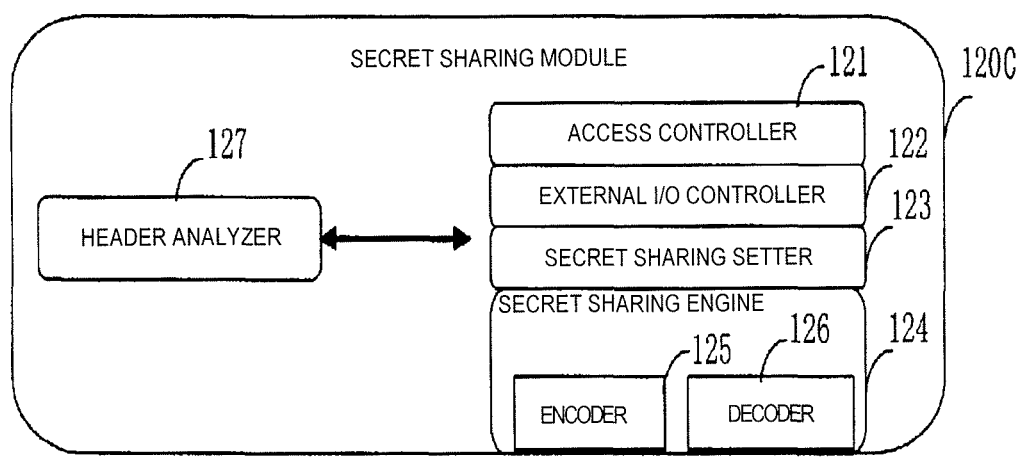
FIG. 15 is a block diagram illustrating a configuration example of a secret sharing module according to the fourth embodiment.

FIG. 15 is a block diagram illustrating a configuration example of secret sharing module 120C. Here, only a configuration of header analyzer 127 is described, and descriptions of configurations of the other constituent components are omitted.

Header analyzer 127 reads and analyzes the header portion that is included in shared file 1C that is received from content delivery server 400C. The server setting information described above is included in the header portion of shared file 1C. Based on the server setting information, header analyzer 127 generates the setting information and the empty file to retain the setting information and the empty file to a predetermined saving place (for example, secondary storage device 157 and secret sharing setter 123). Header analyzer 127, for example, may perform the activation of secret sharing module 120C, and the activation of the first application.

Because a configuration of content delivery server 400C is the same as the configuration of content delivery server 400A, a description of the configuration is omitted.

Figure 16B:
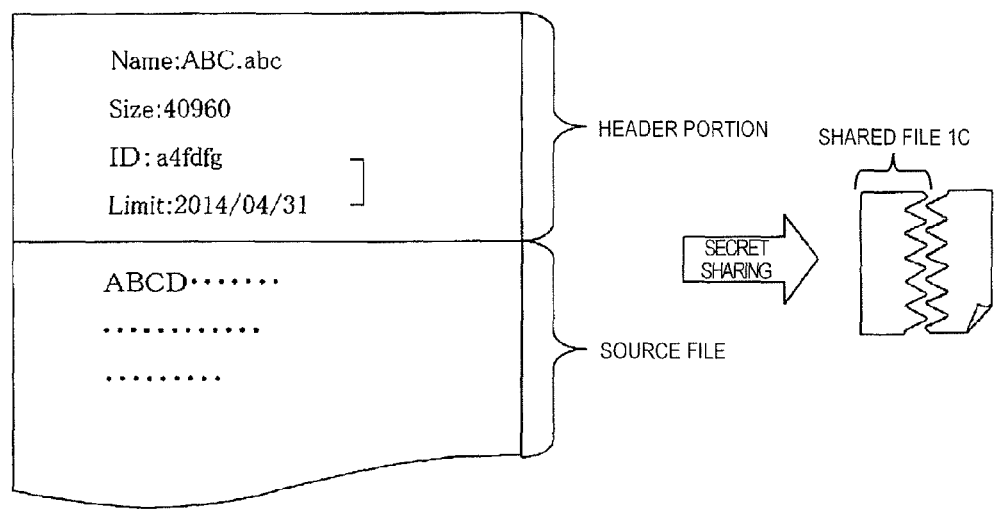
FIG. 16B is a schematic diagram illustrating an example of the format configuration of the shared file according to the fourth embodiment.

FIGS. 16A and 16B are schematic diagrams illustrating an example of a format configuration of shared file 1C.

Encoder 415 of content delivery server 400C, for example, performs the encoding of the source file, generates multiple shared files that include shared file 1, and generates the server setting information. Secret sharing setter 413 may retain the server setting information in advance, and may generate the server setting information when the sharing processing is performed and retain the server setting information. The server setting information, for example, includes attribute information on the source file (for example, information on an extension), and includes generation information of the empty file. Encoder 415 adds the generated server setting information to a header of shared file 1 or of the source file, and generates a result of the addition as shared file 1C (in the case of the source file, the sharing is performed after adding the header).

To be more precise, when compared with content delivery server 400A, content delivery server 400C is different in that the server setting information is not included in the setting file, but included in the header portion of shared file 1C or the source file.

As illustrated in FIG. 16A, secret sharing setter 413 stores data of shared file 1 in the data portion, stores the server setting information in the header portion and generates shared file 1C to retain generated shared file 1C to storage 430. To be more precise, shared file 1C includes data of shared filed 1 and server setting information in one file.

As illustrated in FIG. 16B, secret sharing setter 413 may store data of the source file in the data portion, may perform the encoding on the file, in the header portion of which the server setting information (the attribute information on the source file, such as an extension, or an expiration date of the secret sharing) is stored, and may generate the shared file.

In FIG. 16B, in data management apparatus 100C, header analyzer 127 performs the decoding on the header portion of shared file 1C and acquires server setting information before generating the empty file. Header analyzer 127 generates the empty file according to the server setting information.

In FIG. 16B, because the encoding is also performed on the header portion, the security in the header portion can be improved. Therefore, although information with higher concealment and higher confidentiality is stored in the header portion, the likelihood of the information leakage can be reduced. For example, various IDs, and information indicating an expiration date of the source file are included in the server setting information that is stored in the header. Secret sharing module 410 retains generated shared file 1C in storage 430.

In this manner, in a case where the format configuration that is illustrated in FIG. 16B is used, falsification of the header portion can be suppressed.

Next, an example of an operation by data management apparatus 100C is described.

Figure 17:
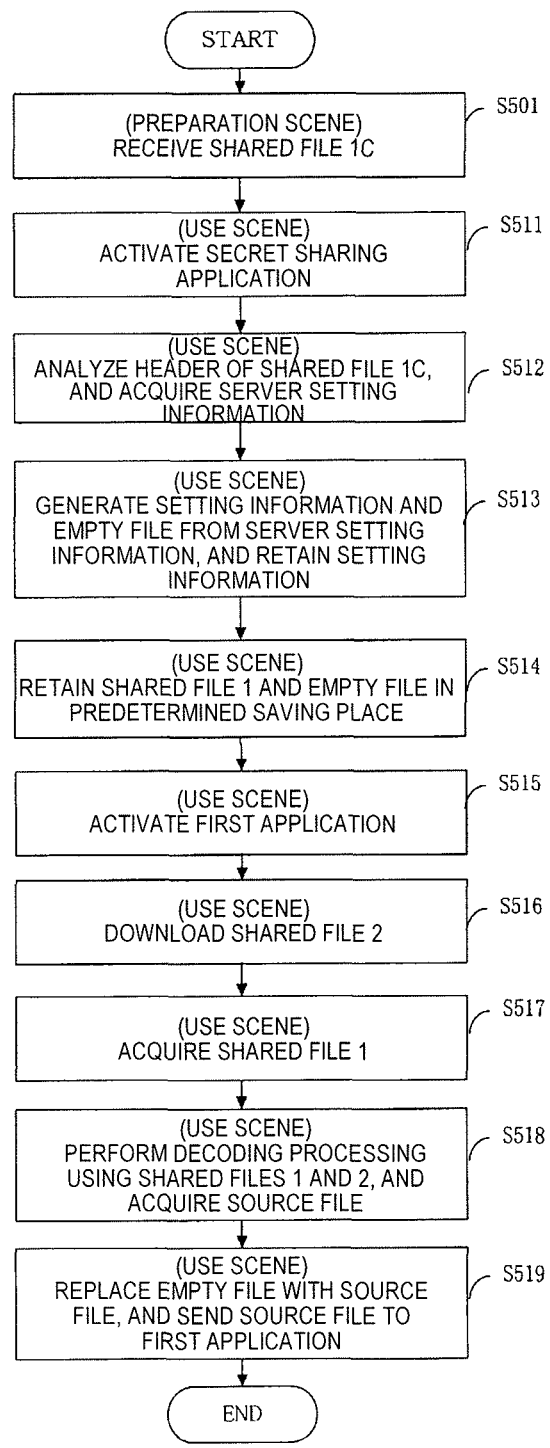
FIG. 17 is a flowchart illustrating an operational example of a data management apparatus according to the fourth embodiment.

FIG. 17 is a flowchart illustrating the example of the operation by data management apparatus 100C. In FIG. 17, it is assumed that shared file 1C has the format configuration illustrated in FIG. 16A. It is assumed that secret sharing module 120 is always activated. To be more precise, it is assumed that the secret sharing application is resident.

In the preparation scene, for example, when through console 16, the user provides an instruction to transmit the content that is delivered by content delivery server 400C, external I/O controller 122 causes the transmission request to be transmitted and causes shared file 1C relating to the content to be received from content delivery server 400C (S501). In this case, content delivery server 400C transmits shared file 1C retained in storage 430. Shared file 1C is retained in a predetermined saving destination (for example, secondary storage device 157). An extension of the secret sharing application is added to shared file 1C.

In the use scene, the user of data management apparatus 100 C activates secret sharing application (S511). The activation of the secret sharing application, for example, is performed in a case where the user clicks on shared file 1C through console 16.

When secret sharing application is activated, header analyzer 127, for example, acquires shared file 1C retained in secondary storage device 157, analyzes the header portion of shared file 1C, and acquires the server setting information from the header portion (S512).

Based on the server setting information, header analyzer 127 generates the setting information that is used by secret sharing setter 123, and the empty file. Header analyzer 127 retains the setting information in secret sharing setter 123 (S513).

Header analyzer 127 refers to the server setting information, and retains shared file 1 that is included in the data portion of shared file 1C, in a predetermined saving place (for example, secondary storage device 157) or storage server 201 (S514).

Header analyzer 127 refers to the server setting information, adds an extension that is used by the first application, to an empty file, and retains the empty file in a predetermined saving place (for example, secondary storage device 157) (S514). Accordingly, it is possible for the first application to process the empty file.

Header analyzer 127 instructs application processor 110 to send the address information (the information of the saving destination) of the empty file and activate the first application (S515).

External I/O controller 122 requests content delivery server 400C to transmit the shared data that is included in shared file 2. External I/O controller 122 causes the shared data that is included in shared file 2, to be downloaded from content delivery server 400C (S516).

Secret sharing module 120C refers to the setting information, and acquires the shared data that is included in shared file 1, from the saving designation (for example, secondary storage device 157) of shared file 1 (S517). Accordingly, in data management apparatus 100C, the data of shared file 1 and data of shared file 2 make a pair.

Decoder 126 refers to the setting information retained in secret sharing setter 123, and performs the decoding using the shared data of shared file 1, which is acquired, and the shared data of shared file 2 (S518).

Filter driver 152 acquires the empty data that is included in the empty file from secondary storage device 157, and acquires the source data obtained by the decoding from secret sharing module 120C. Filter driver 152 replaces the empty data with the source data, and sends the source data to application processor 110 (S519). Accordingly, application processor 110 can obtain the content file as the source file.

According to the reception of shared file 1C in S501, processing operations up to and including the operation in the use scene may be collectively performed without a special operation. To be more precise, the preparation scene and the use scene may not be separated from each other.

According to the example of the operation by data management apparatus 100C, by making a request to content delivery server 400C for one time content delivery, for example, by requesting the transmission of shared file 1C, the content file can be acquired as the source file. As the user operation, the retaining of the setting information relating to the secret sharing processing, the creation of the empty file, the download of the insufficient shared file, the decoding, and the replacement of the source file with the empty file and of the empty file with the source file are collectively performed only with an operation of selecting (clicking on) shared file 1C. Therefore, the user can enjoy the content in a simple and safe manner.

In a case where shared file 1C that has the format configuration illustrated in FIG. 16B is used, because the encoding is also performed on the header portion of the source file, the security in the content delivery can be improved further.

With data management system 1000C, the preparation scene can be completed by receiving one shared file 1C at the time of the content delivery. Furthermore, because the empty file has to be generated from shared file 1C until the use scene is started, for example, the number of files relating to the secret sharing, which are retained in secondary storage device 157, can be decreased. In the use scene, for example, with a user's simple operation of selecting the shared file through console 16, the first application can acquire the source file. Therefore, the content can be enjoyed in a simple and safe manner.

The present disclosure is not limited to the embodiments described above, and can be applied to whatever configuration can accomplish functions recited in claims, or functions performed by the configuration of each of the embodiments described above.

For example, according to the embodiments described above, a known encryption technology may be combined with the secret sharing technology. Accordingly, the security at the time of the secret sharing processing can be improved further.

The present disclosure is useful for a data processing method, a data processing device and the like that can improve the security in data management.

What is claimed is:

1. A data processing method in a processing device that is connected to an external storage device and that is equipped with an internal storage device and application software, wherein the application software operates a source file including source data and attribute information of the source data, the method comprising:
    when a writing instruction to store the source file at a designated storing destination in the internal storage device occurs through the application software,
    replacing the source data of the source file with replacement data and generating a replacement file to be processed by the application software including the replacement data and the attribute information of the source data without changing the attribute information;
    dividing the source data of the source file into multiple pieces of division data;
    setting information for dividing processing for associating the source file, the replacement file and the multiple pieces of division data with each other, that includes the designated storing destination of the source file in the internal storage device as the storing destination of the replacement file, and that includes each writing instruction destination of each of the multiple pieces of division data that is stored in the external storage device;
    storing the each of the multiple pieces of division data to the each writing instruction destination with reference to the information and set in the dividing processing;
    storing the replacement file at the designated storing destination in the internal storage device instead of the source file.

2. The data processing method of claim 1,
    wherein the replacement data is NULL data or random data.

3. The data processing method of claim 1,
    wherein the replacement data is data that is a sequence of 0s or 1s, and the replacement data is stored in a compressed manner in the internal storage device.

4. The data processing method of claim 1,
    wherein the source data and the replacement data are pieces of data that are able to be processed with the same application, and
    wherein the multiple pieces of division data are pieces of data that are not able to be processed by the application software.

5. The data processing method of claim 1, further comprising:
    generating generation data for associating the source data, the replacement data, and the multiple pieces of division data with one another.

6. The data processing method of claim 5, further comprising:
    combining the generation data with the multiple pieces of division data.

7. The data processing method of claim 1,
    wherein in the dividing of the source data into the multiple pieces of division data, the division data is generated using a secret sharing method, and the source data is not stored in the internal storage device.

8. The data processing method of claim 1, further comprising:
    receiving a reading instruction of the source file;
    reading the replacement file from the internal storage device;
    collecting the each of the multiple pieces of division data from the each writing instruction destination with reference to the attribute information of the source data;
    restoring the restored source data using the multiple pieces of division data;
    replacing the replacement data of the replacement file with the restored source data and generating a restored source file including the restored source data and the attribute information of the source data; and
    transmitting the restored source file to the application software.

9. A data processing device to which a data processing server is configured to be connected, comprising:
    a processor;
    an internal storage;
    a memory including instructions that when executed by the processor, cause the processor to perform operations including:
    receiving a writing instruction through application software to store a source file including source data and attribute information of the source data at a designated storing destination in the internal storage;
    dividing source data of the source file into multiple pieces of division data;
    storing each of the multiple pieces of division data to each writing instruction destination that is in the internal storage or an external storage, wherein at least one of the pieces of division data is stored in the external storage device;
    replacing the source data of the source file with replacement data and generating a replacement file including the replacement data and attribute information of the source data, wherein the replacement file is visible as an operative file by the application software; and
    storing the replacement file at the designated storing destination in the internal storage device instead of the source file.

* * * * *